United States Patent
Nagaraja et al.

(10) Patent No.: US 12,395,532 B2
(45) Date of Patent: *Aug. 19, 2025

(54) EGRESS TRAFFIC POLICY ENFORCEMENT AT TARGET SERVICE ON TRAFFIC FROM CUSTOMER NETWORK

(71) Applicant: Oracle International Corporation, Redwood Shores, CA (US)

(72) Inventors: Girish Nagaraja, Sammamish, WA (US); Martin John Sleeman, Redmond, WA (US); Thomas Ray Bakita, Saint George, UT (US); Richard Benjamin Stockton, Minneapolis, MN (US); Troy Ari Levin, Huntingdon Valley, PA (US); Jinsu Choi, Seoul (KR); Thomas James Andrews, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/375,382

(22) Filed: Sep. 29, 2023

(65) Prior Publication Data

US 2025/0007956 A1    Jan. 2, 2025

Related U.S. Application Data

(60) Provisional application No. 63/524,539, filed on Jun. 30, 2023.

(51) Int. Cl.
*H04L 9/40* (2022.01)
*H04L 47/2483* (2022.01)

(52) U.S. Cl.
CPC .......... *H04L 63/20* (2013.01); *H04L 47/2483* (2013.01); *H04L 63/0236* (2013.01)

(58) Field of Classification Search
CPC .. H04L 63/20; H04L 47/2483; H04L 63/0236
See application file for complete search history.

(56) References Cited

U.S. PATENT DOCUMENTS 9,294,507 B1 * 3/2016 Roth .................... H04L 63/105
9,680,801 B1 * 6/2017 Martini ................ H04L 67/141
(Continued)

FOREIGN PATENT DOCUMENTS

WO    2022146466 A1    7/2022
WO    2023147051 A1    8/2023

OTHER PUBLICATIONS

U.S. Appl. No. 18/375,366, "Notice of Allowance", mailed Mar. 28, 2024, 16 pages.
(Continued)

*Primary Examiner* — Sm A Rahman
(74) *Attorney, Agent, or Firm* — Kilpatrick Townsend & Stockton LLP

(57) ABSTRACT

Techniques for enforcing an egress policy at a target service are described. In an example, traffic is generated for a customer, where the traffic is generated by a customer network of the customer, such as a customer tenancy or an on-premise network. The traffic can be destined to the target service. The traffic can be tagged by the customer network (e.g., by a gateway of the customer network). The customer network can be associated with the egress policy. The target service can determine the egress policy based on the information tagged to the traffic and can enforce the egress policy on the traffic that the target service is receiving.

20 Claims, 22 Drawing Sheets

(56) References Cited

U.S. PATENT DOCUMENTS

| | | |
|---|---|---|
| 10,498,665 B1 | 12/2019 | Meck et al. |
| 10,855,562 B2 | 12/2020 | Hegde et al. |
| 11,457,403 B2 | 9/2022 | Kim et al. |
| 11,477,165 B1 * | 10/2022 | McDowall .......... H04W 12/088 |
| 12,052,172 B1 | 7/2024 | Nagaraja et al. |
| 12,177,110 B1 | 12/2024 | Choudhry et al. |
| 2012/0023217 A1 | 1/2012 | Wakumoto |
| 2012/0250502 A1 | 10/2012 | Brolin |
| 2012/0281706 A1 | 11/2012 | Agarwal et al. |
| 2016/0080212 A1 | 3/2016 | Ramachandran et al. |
| 2017/0142007 A1 | 5/2017 | Nedeltchev et al. |
| 2019/0007275 A1 | 1/2019 | Clemm et al. |
| 2019/0058768 A1 | 2/2019 | Feijoo et al. |
| 2019/0296978 A1 | 9/2019 | Seshadri et al. |
| 2020/0076769 A1 | 3/2020 | Mishra et al. |
| 2021/0006551 A1 | 1/2021 | Sathasivam et al. |
| 2021/0273910 A1 | 9/2021 | Lu et al. |
| 2021/0377185 A1 | 12/2021 | Durrani et al. |
| 2022/0021610 A1 | 1/2022 | Kreger-Stickies et al. |
| 2022/0030495 A1 | 1/2022 | Qiao et al. |
| 2022/0038308 A1 | 2/2022 | Motwani et al. |
| 2022/0060858 A1 | 2/2022 | Manithara Vamanan et al. |
| 2022/0210035 A1 | 6/2022 | Hendrickson et al. |
| 2022/0255854 A1 | 8/2022 | Baker et al. |
| 2022/0417150 A1 | 12/2022 | Jain et al. |
| 2023/0026865 A1 | 1/2023 | Rolando et al. |
| 2023/0093278 A1 | 3/2023 | Majila et al. |
| 2023/0164076 A1 | 5/2023 | Dawani et al. |
| 2023/0168917 A1 | 6/2023 | Kavathia et al. |
| 2023/0251908 A1 | 8/2023 | Hernandez Serrano |
| 2023/0344777 A1 | 10/2023 | Brar et al. |
| 2024/0086218 A1 | 3/2024 | Olazabal et al. |
| 2024/0129258 A1 | 4/2024 | Ead et al. |
| 2024/0179074 A1 | 5/2024 | Kommula et al. |
| 2024/0235866 A1 | 7/2024 | Talebi Fard et al. |
| 2024/0259263 A1 | 8/2024 | Choi et al. |
| 2024/0333626 A1 | 10/2024 | Thakore et al. |
| 2024/0380638 A1 | 11/2024 | Zong et al. |

OTHER PUBLICATIONS

U.S. Appl. No. 18/375,374, Non-Final Office Action mailed on Sep. 23, 2024, 18 pages.

U.S. Appl. No. 18/375,374, Notice of Allowance mailed on Mar. 7, 2025, 7 pages.

U.S. Appl. No. 18/375,387, Non-Final Office Action mailed on Nov. 27, 2024, 22 pages.

U.S. Appl. No. 18/741,635, Non-Final Office Action mailed on Feb. 13, 2025, 22 pages.

Application No. PCT/US2024/036101, International Search Report and Written Opinion mailed on Oct. 2, 2024, 13 pages.

Application No. PCT/US2024/036119, International Search Report and Written Opinion mailed on Oct. 16, 2024, 14 pages.

Application No. PCT/US2024/036133, International Search Report and Written Opinion mailed on Oct. 14, 2024, 14 pages.

Application No. PCT/US2024/036145, International Search Report and Written Opinion mailed on Oct. 16, 2024, 12 pages.

U.S. Appl. No. 18/375,374, "Corrected Notice of Allowability", Jun. 3, 2025, 2 pages.

U.S. Appl. No. 18/375,387, Final Office Action, Mailed On Jun. 13, 2025, 26 pages.

U.S. Appl. No. 18/741,635, Notice of Allowance, Mailed On May 29, 2025, 14 pages.

* cited by examiner

EGRESS TRAFFIC POLICY ENFORCEMENT AT TARGET SERVICE ON TRAFFIC FROM CUSTOMER NETWORK

CROSS-REFERENCE TO RELATED APPLICATIONS

The present application claims the benefit and priority under 35 U.S.C. 119 (e) of U.S. Provisional Patent Application No. 63/524,539, filed Jun. 30, 2023, entitled, "EGRESS TRAFFIC POLICY ENFORCEMENT AT TARGET SERVICE," the content of which is herein incorporated by reference in its entirety for all purposes.

BRIEF SUMMARY

The present disclosure relates to virtualized cloud environments. Techniques are described for egress traffic policy enforcement at a target service.

Some embodiments of the present disclosure relate to performing an action on traffic that originates from a network and is destined to a service of a service tenancy. Such traffic can be referred to as egress traffic because it egresses from the network. In an example, the network is a virtual cloud of a customer that is associated with a customer tenancy. In another example, the network is an on-premise network of the customer. In both examples, the egress traffic can correspond to a direct traffic flow because the traffic egresses directly from a network of the customer. In yet another example, the network belongs to a multi-customer tenancy that provides services to different customers. In this example, the egress traffic can correspond to an indirect traffic flow because the traffic egresses from the multi-customer tenancy on behalf of the customer. In all three examples, the customer can define an egress policy that specifies an action to be performed (e.g., allow traffic, disallow traffic, allow a write operation, etc.) based on a set of conditions being met. One of such conditions can indicate network location belonging to the network and from which the traffic egresses from the network. For example, the network location can correspond to a gateway (e.g., a service gateway). As such, if the traffic egresses from the network location, the action can be performed on the traffic. Enforcement of the egress policy can be performed by the service to which the traffic is destined. For example, the service can determine the action to be performed by making an application programming interface (API) call to a policy evaluator, where this call can indicate some or all of the values of the conditions (e.g., by including an identifier of the network location). The policy evaluation can respond with an indication of the action to be performed.

In the direct traffic flow examples, the network location from which the traffic egresses out of the network (e.g., the service gateway) can tag the traffic with information not only about the network but also about the network location. For example, this information can include an identifier of the network, a source internet protocol (IP) address, and an identifier of the network location (e.g., a data plane identifier (DPID) that is different from a network address of the network location such as its IP address). This information can be included in one or more IP options fields in a packet that represents a portion of the traffic.

In the indirect traffic flow examples, the network location from which the traffic egresses out of the network (e.g., the service gateway) can also tag the traffic with similar information. Here, however, the network location belongs to a multi-customer tenancy and, thus, handles different traffic of multiple customers. As such, the network location can determine an identifier of a compute resource executing in the multi-customer tenancy for the customer and from which the traffic originates. This identifier can be associated with the customer. The network location can tag the traffic with the identifier such that, when the service receives the traffic, the customer's egress policy can be determined and enforced.

Various embodiments are described herein, including methods, systems, non-transitory computer-readable storage media storing programs, code, or instructions executable by one or more processors, and the like.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
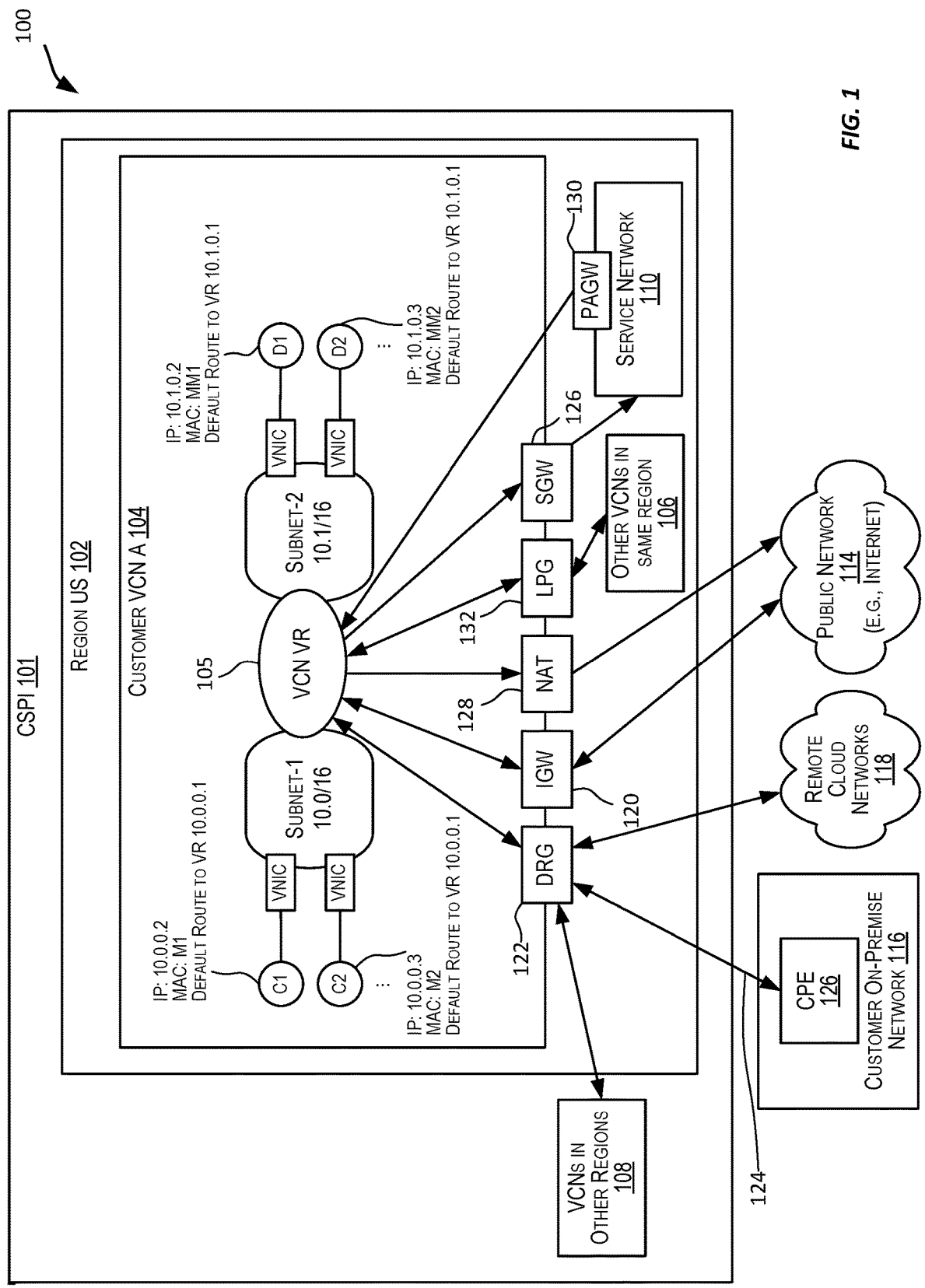
FIG. 1 depicts a distributed environment according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A—Example Virtual Networking Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 17, 18, 19, and 20 (see references 1716, 1816, 1916, and 2016) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 18, 19, 21, and 22 and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the other endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 17, 18, 19, and 20 (for example, gateways referenced by reference numbers 1734, 1736, 1738, 1834, 1836, 1838, 1934, 1936, 1938, 2034, 2036, and 2038) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the other endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associated with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
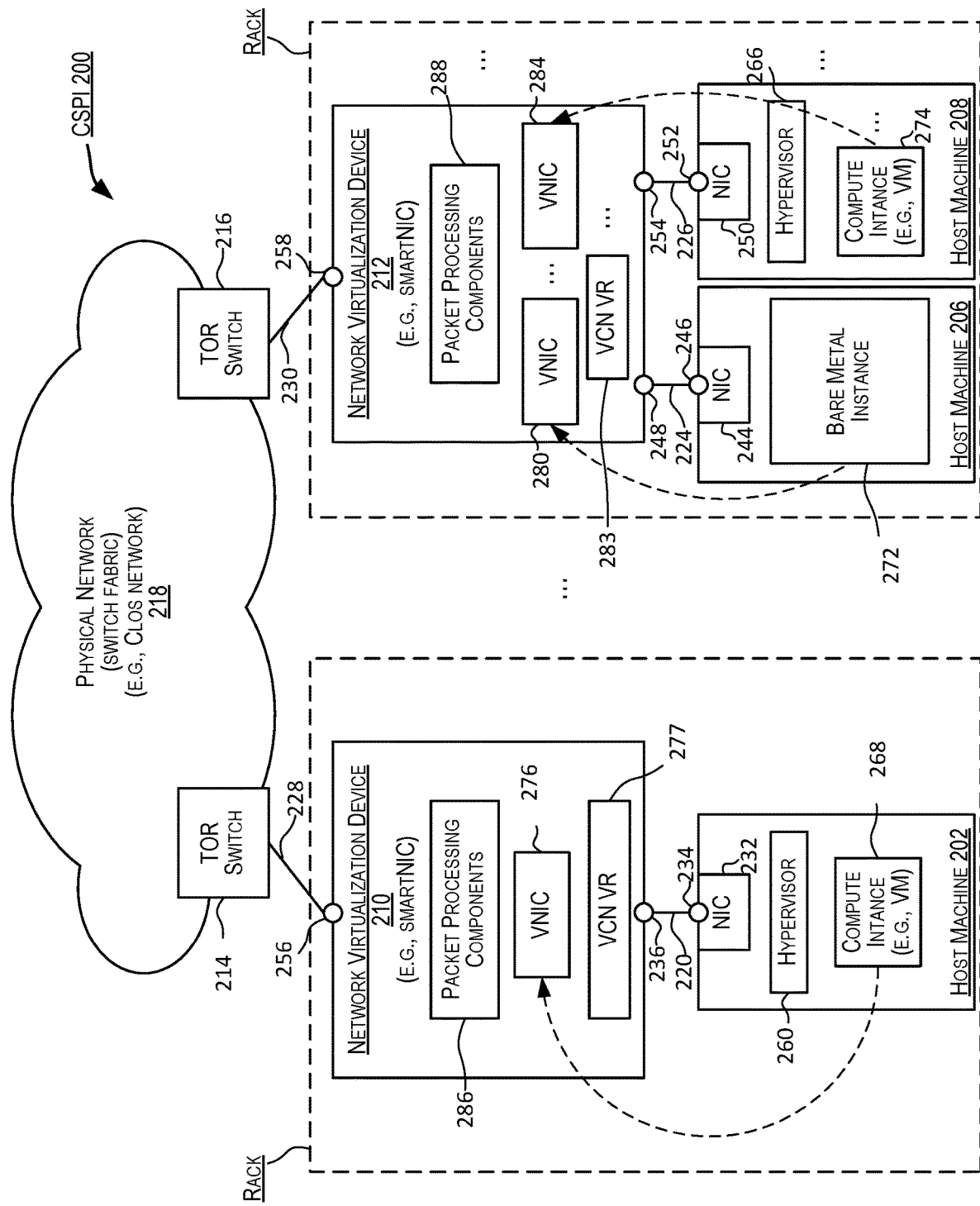
FIG. 2 depicts a simplified architectural diagram of physical components in a physical network within cloud service provider infrastructure (CSPI) that provide an underlay for a virtual network according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
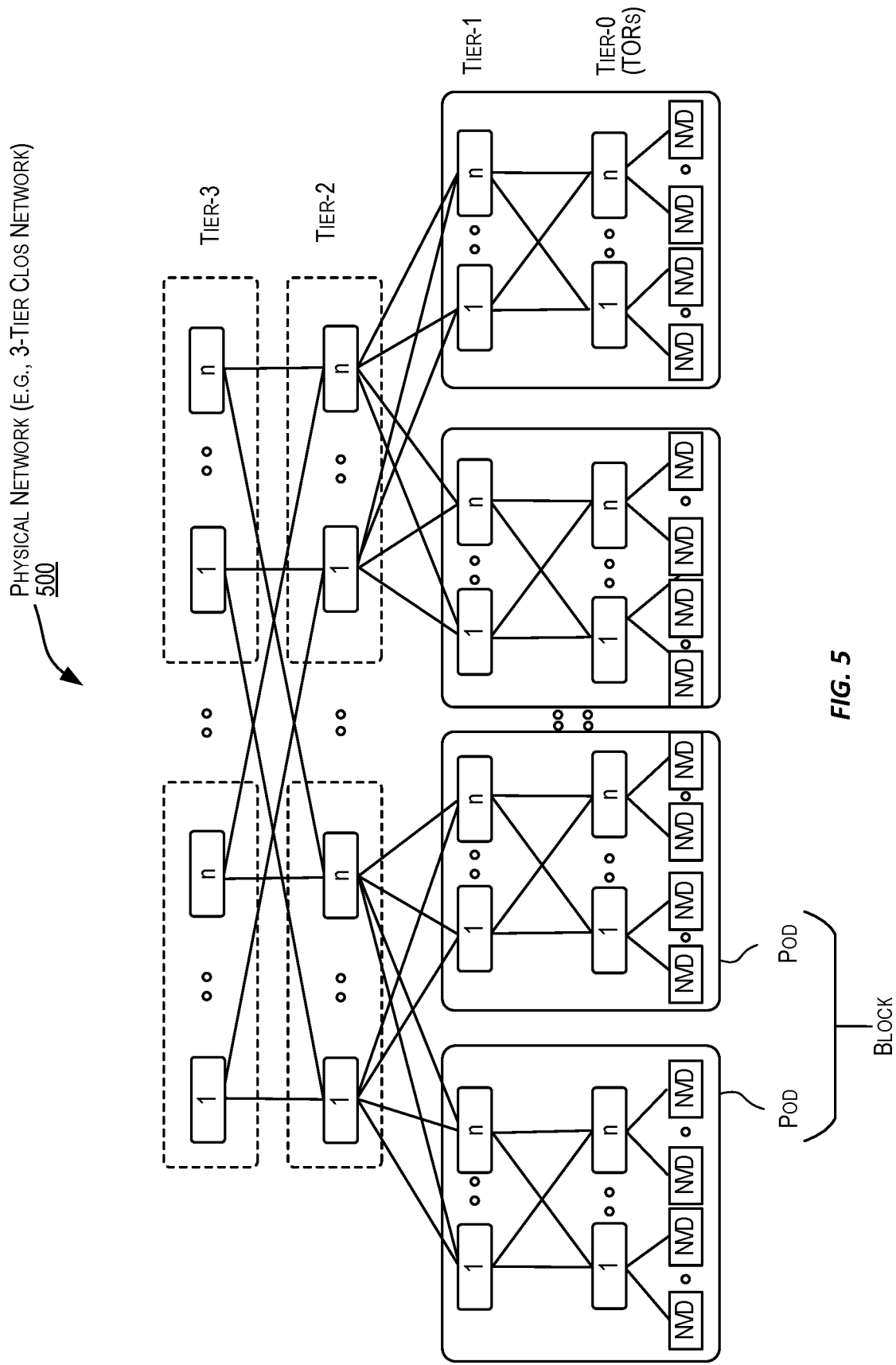
FIG. 5 depicts a simplified block diagram of a physical network according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
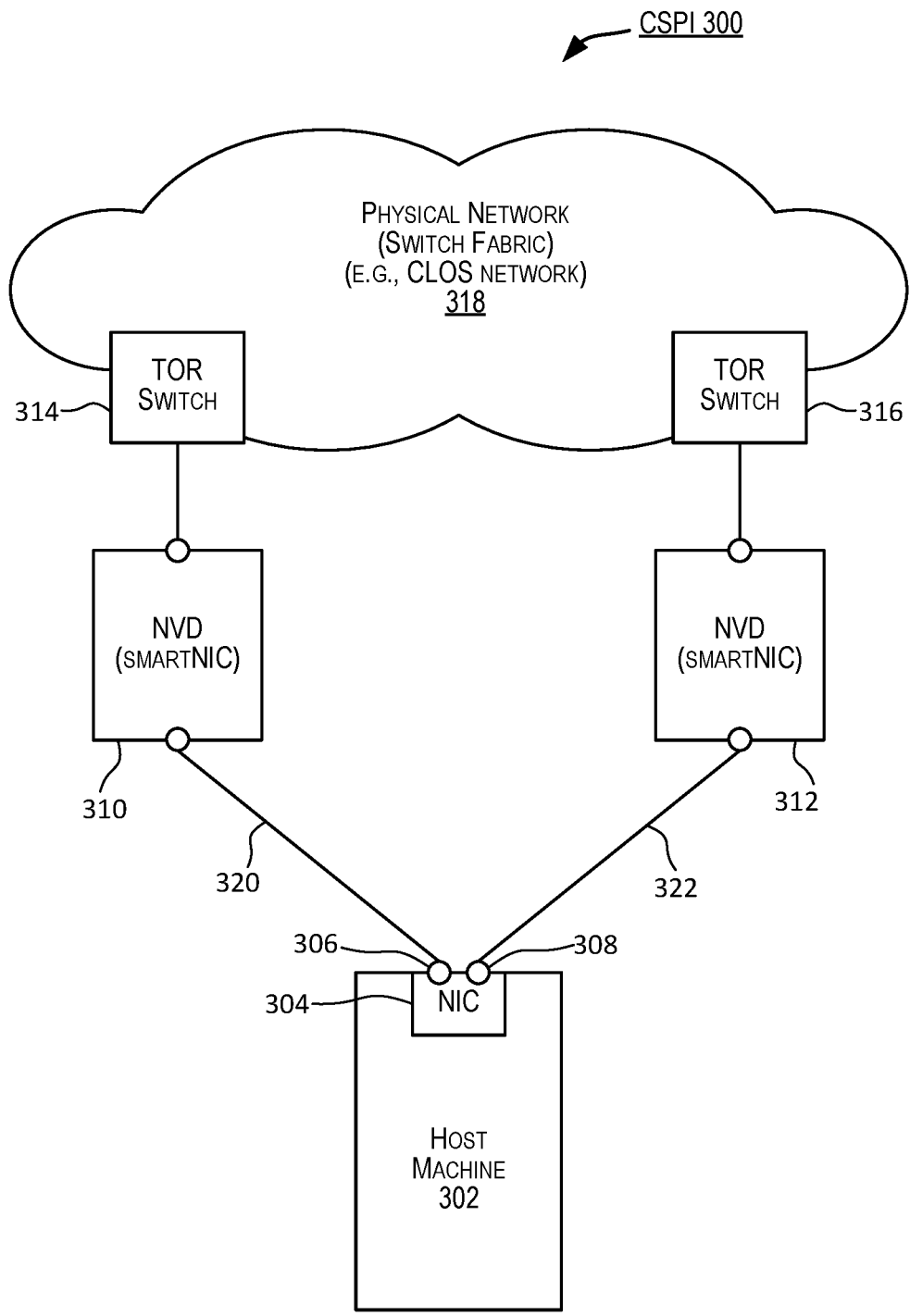
FIG. 3 shows an example within CSPI where a host machine is connected to multiple network virtualization devices (NVDs)

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320 and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch, or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two endpoints (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 18, 19, 20, and 21 (see references 1816, 1916, 2016, and 2116) and described below. Examples of a VCN Data Plane are depicted in FIGS. 18, 19, 20, and 21 (see references 1818, 1918, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206 and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200 or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
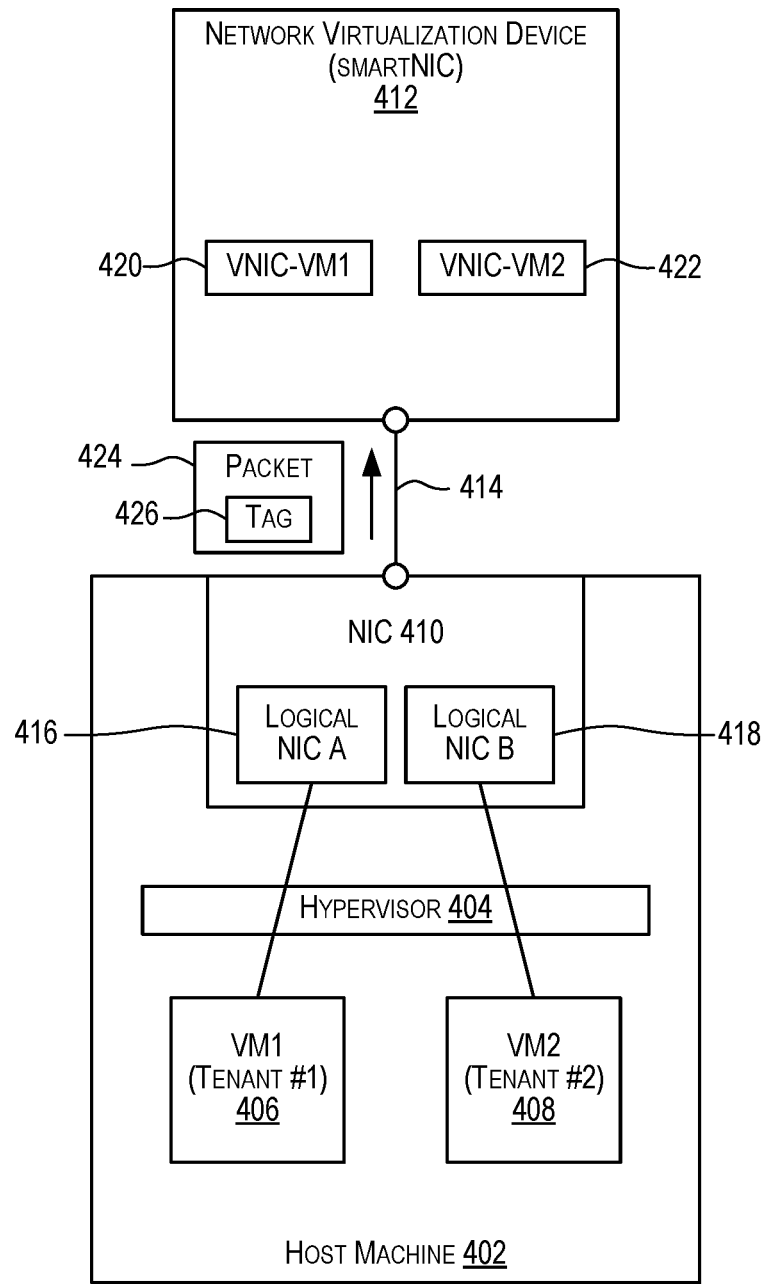
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where,
    ocid1: The literal string indicating the version of the CID;
    resource type: The type of resource (for example, instance, volume, VCN, subnet, user, group, and so on);
    realm: The realm the resource is in. Example values are "c1" for the commercial realm, "c2" for the Government Cloud realm, or "c3" for the Federal Government Cloud realm, etc. Each realm may have its own domain name;
    region: The region the resource is in. If the region is not applicable to the resource, this part might be blank;
    future use: Reserved for future use.
    unique ID: The unique portion of the ID. The format may vary depending on the type of resource or service.

B—Egress Traffic Policy Enforcement

Generally, data exfiltration occurs when, for example, a malicious actor carries out an unauthorized data transfer from a network. Techniques to prevent data exfiltration are disclosed herein and involve enforcing an egress traffic policy at a target service.

Techniques can be implemented to prevent data exfiltration via gateways to a service of service tenancy. Data exfiltration can occur, when a user with proper user credential unauthorizedly sends traffic out of a network (e.g., in the case of rogue principal that has legitimate access to the customer's data can push it outside the customer's control) to another tenancy using a different identity that has valid access to the target. Case in point is a user in a tenancy who has access to sensitive data can access it from authorized network locations and export it to a storage endpoint in a different tenancy that the user has access to with a different identity. This can be executed from the same authorized network since the network allows egress to multi-tenant storage endpoints in a region. There are other ways data can be exfiltrated out of a customer's network and cannot be properly blocked using existing access controls via network access control lists (ACLs) and firewall rules. Secondary (or indirect) exfiltration paths exist whereby a rogue principal could inject credentials into a service of a multi-customer tenancy, where the service accesses a shared endpoint via a gateway.

As disclosed herein, controls are provided to a customer to monitor and restrict all egress from network gateways in order to control traffic to specific target services identified by the payloads regardless of whether the endpoints being accessed are multi-tenant or not. In other words, the customer can restrict network access on a single multi-tenant endpoint exposed via gateways to only allow access to specific targets. A multi-tenant endpoint can be an endpoint providing access to a service to multiple customer tenancies, such as each customer tenancy can have access to a set of target resources exposed by the multi-tenant endpoint. The customer can exercise control over traffic flowing over their own egress points regardless of whether it is intended for their own tenancy or another. Such approach can supplement the use of access control lists, firewalls, and other techniques where such techniques may not be sufficient to prevent the data exfiltration.

As disclosed herein, multi-tenant services (also referred to as multi-tenant endpoints and/or multi-tenant service endpoints), such as an object storage service, support evaluating network egress policies defined by the tenancy from where the traffic exited (in the case of a direct traffic flow) or associated with such a tenancy (e.g., in the case of an indirect traffic flow), to block access to unauthorized targets not allowed by those policies. This evaluation can be done as a pre-requisite check prior to user authorization, and traffic can be blocked based on the policies enforced by the network owner regardless of who the calling/requesting user is or whether the calling/requesting user has permissions to access to the target or not. Network egress policies can be authored and persisted from the reference point of the tenancy that owns or is associated with a network location (e.g., a gateway) used for egress and can be distinct than either the caller's tenancy or the target tenancy.

In an example, a target service (e.g., corresponding to a multi-tenant endpoint) is configured to apply a network egress policy indicating whether egress traffic from a customer network is authorized or not. The network egress policy can be used in conjunction with other access controls, such as ACLs, firewalls, etc. The egress traffic is tagged with an identifier associated with the customer network. The identifier is used to look up the relevant network egress policy and determine whether this policy allows the egress traffic to the target service or not. In the case of a customer VCN, a service gateway of the VCN tags the traffic with source network IP, VCN-ID, Gateway-ID, and, optionally, tenancy-ID and resource-ID. In the case of an on-premise network, an on-premise gateway tags the egress traffic with a cloud ID unique to the customer (e.g., OCID in the case of OCI).

In an example, a target service (e.g., corresponding to a multi-tenant endpoint) is configured to apply a network egress policy indicating whether egress traffic from a customer network is authorized or not. The egress traffic is tagged with data that is used to identify the customer network and determine the network egress policy defined for the customer network. The tag is added to the header of a packet and includes many fields associated with the network egress policy. Among these fields are a metadata field, an overlay private endpoint destination IP field, and a private access resource data plane ID field. The metadata can be used to determine the relevant network egress policy and how this policy applies (e.g., depending on the service gateway from which the traffic is egressing).

In an example, a target service (e.g., corresponding to a multi-tenant endpoint) is configured to apply a network egress policy indicating whether egress traffic is authorized or not. In the indirect traffic flow use case, a challenge is that the egress traffic does not flow from a customer tenancy. Instead, it egresses from a service (e.g., an OSN service) in a service tenancy available to multiple customers (e.g., the traffic is from a service gateway handling OSN services spawned for multiple customers). Hence, it is challenging to identify which customer tenancy the egress traffic should be associated with to then apply the relevant network egress traffic. To resolve such challenge, a customer defines the network egress policy. During the spawning of the service, an identifier unique to the customer is determined. When traffic of the service is sent to a service gateway of the service tenancy, this egress traffic is tagged with the identifier. Upon the target service receiving the egress traffic, the identifier is used to look up the network egress policy for enforcement.

In an example, a network egress policy is defined by a customer to control the flow of its traffic outside the boundary of a customer network. Traffic egressing from the customer network or from a service spawn for the customer is tagged with data to determine the network egress policy. A target service (e.g., corresponding to a multi-tenant endpoint) is configured to apply the network egress policy based on the tag. The network egress policy can be defined at different levels of granularity.

Figure 6:
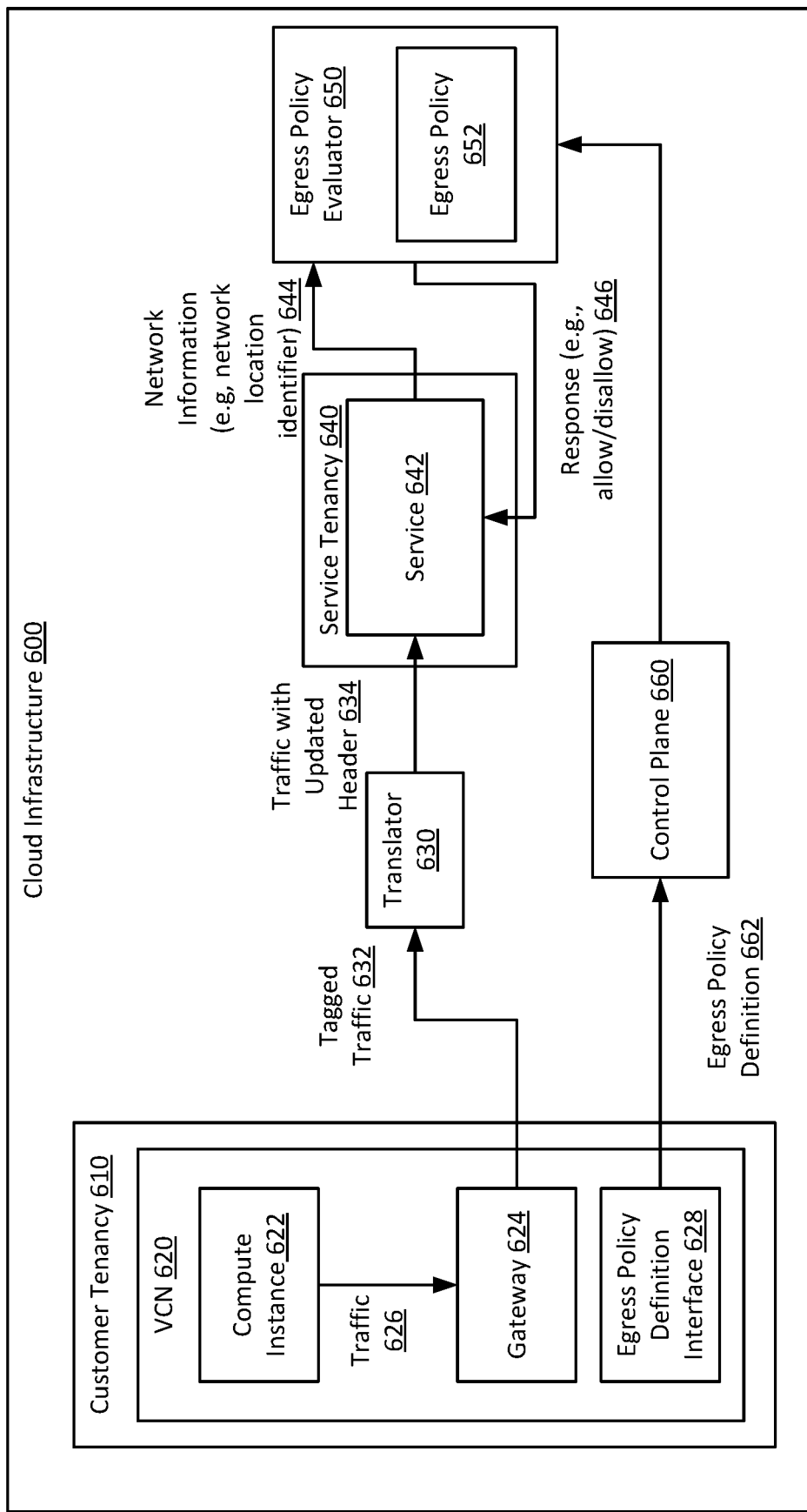
FIG. 6 illustrates an example of a cloud infrastructure that implements egress traffic policy enforcement at a target service to prevent or mitigate the risk of data exfiltration according to embodiments of the present disclosure.

FIG. 6 illustrates an example of a cloud infrastructure 600 that implements egress traffic policy enforcement at a target service (e.g., corresponding to a multi-tenant endpoint, such as a service 642 illustrated in this figure) to prevent or mitigate the risk of data exfiltration according to embodiments of the present disclosure. The cloud infrastructure 600 is an example of any of the CSPIs described in the present disclosure.

As illustrated in the example of FIG. 6, the cloud infrastructure 600 hosts a customer tenancy 610 for a customer (although a larger number of customer tenancies can be hosted for the same customer and/or different customers). The customer tenancy 610 includes a VCN 620 (here also, the customer tenancy 610 can include a larger number of VCNs and/or other computer resources). The cloud infrastructure 600 also includes a service tenancy 640. The service tenancy 640 can provide a service 642 to the customer tenancy 610 (although a larger number of service tenancies and/or service per tenancy are possible). The service tenancy 640 can be a multi-customer service tenancy, whereby the service 642 can be available to customer tenancies associated with different customers. The service 642 can be a multi-tenant service (which can also be referred to or include a multi-tenant endpoint), whereby the service 642 is available to the different customer tenancies. The service 642 can provide any or a combination of, for example, object storage, database management, security information and event management, a logging service, and the like.

In an example, a user can operate a user device and request a compute instance 622 to execute in the VCN 620. The compute instance 622 can have access to data of the VCN 620 (e.g., stored at a computing resource of the VCN 620, or stored outside the VCN 620 and accessible from the VCN 620). Via the compute instance 622, the user can request such data to be sent to the service 642. As such, the data can represent traffic 626 sent from the VCN 620 and destined to the service 642 (e.g., egress traffic to the service 642). The traffic 626 can be sent from a network location of the VCN 620, such as a gateway 624 (e.g., a service gateway in the illustrative example of FIG. 6). This type of traffic corresponds to a direct traffic flow from the customer tenancy 610.

To prevent or mitigate the risk of data exfiltration, traffic tagging and egress policy enforcement are used. For example, the gateway 624 tags the traffic 626 with network information 644 that indicates among other things the network location from which the traffic 626 egresses out of the customer tenancy 610 or the VCN 620 (e.g., the network location corresponds to the gateway 624 in FIG. 6). The network information 644 can include, for instance and among other things, an identifier of the VCN 620 and an identifier of the network location (e.g., an identifier of the gateway 624 other than its network address, such as being an identifier unique to the customer tenancy 610 and/or the cloud infrastructure 600 and different from the IP address). The network information can be added to a header of a packet, where the packet represents at least a portion of the traffic 626. Specific network information and tagging thereof are described herein below. The service 642 enforces an egress policy 652 defined by the customer and applicable at least in part because the tagged traffic 632 indicates that it is egressing from the VCN 620 via the gateway 624.

In an example, to define the egress policy 652, the VCN 620 can include a compute resource that provides an egress policy definition interface 628 (e.g., a web interface or an API). An authorized user of the customer can operate a user device and interact with the egress policy definition interface 628 to provide an egress policy definition 622 (e.g., to define the different attributes of the egress policy 652). This egress policy definition interface 628 can be supported by a control plane 660 of the cloud infrastructure 600. In particular, the control plane 660 (rather than a data plane) receives and passes the egress policy definition 622 to an egress policy evaluator 650 (which can be a service of the cloud infrastructure 600). The egress policy evaluator 650 stores the egress policy 652 in a data store in association with the customer tenancy 610 and/or the VCN 620. The egress policy evaluator 650 can respond to a request of the service 642 about the egress policy 652, where the request can include the network information 644 (or information derived from the network information 644). The response 646 can include an action to be performed on the received traffic as indicated by the egress policy 626 based on the network information 644. An example action can be to allow the received traffic (e.g., such that the service 642 can further process it by storing it (in the case of an object storage service), logging it (in the case of a logging service), etc.) or to disallow the received traffic (e.g., by not further processing it). Alternatively, the response 646 can include the egress policy 652 itself or a portion thereof such that the service 642 can evaluate the egress policy 652 and directly determine the action to perform on the received traffic.

Among other things, the egress policy definition 662 indicates the network location(s) from which customer's traffic can egress and action(s) (at a higher granularity level: allow or disallow, at a more granular level: allow/disallow a write operation, allow/disallow an edit operation, etc.) to be performed based on the network location(s), among other conditions. Such a definition can be stored as a set of attributes of the egress policy 652. Examples of these attributes are further described herein below.

As further illustrated in FIG. 6, the cloud infrastructure 600 can also provide a translator 630 (e.g., an example of a service that may be integrated with other services, such as with a load balancer). The translator 632 can translate at least some of the network information 644 included in the tagged traffic 632 (e.g., in IP options fields of the packets representing the traffic 626) into translated network information that can be included in an updated header 634 for the traffic 626 such that the service 642 received the traffic with the updated header 634. The use of the translator 630 can be beneficial in situations where the header size (e.g., particularly the size of an IP options field) is too small to hold the information needed for a lookup of the egress policy 652. Otherwise, the translator 630 may not be used.

To illustrate, consider the following example. The service 642 is a data storage service. The customer defines the egress policy 652 to allow egress traffic to the service 642 such that the represented data can be stored conditioned on the egress traffic being sent via the gateway 624 but not via a second network location of the VCN 620. The egress policy 652 disallows egress traffic via the gateway 624 to a second service of the service tenancy 640 but allows such egress traffic via the second network location.

An authorized user operating a user device can access the compute instance 622 and request data available from the VCN 620 to be stored by the service 642. The traffic 636 represents this data and egresses from the gateway 624. The gateway 624 tags the traffic 626 with network information including a VCN identifier of the VC 620, an overlay source IP address (e.g., the overlay IP address of the compute instance 622), and data plane identifier (DPID) of the gateway 624, resulting in the tagged traffic 632. Such network information 644 can be included in an IP options field in a header of a packet that represents a portion of the traffic 626. Next, the translator 630 receives the tagged traffic 632 and translates the DPID into a cloud identifier (CID) of the gateway 624. This translation can be possible based on a predefined mapping between the DPID and CID, where this predefined mapping is generated upon a registration (e.g., via the control plane 660) of the gateway 624 with the cloud infrastructure 600 (e.g., with the egress policy evaluator 650) as a network location from which traffic of the VCN egresses and to which the egress policy 652 applies. The translator 630 updates the tagged traffic with an updated header 634 that includes the CID, where the updated header 634 can be a Hypertext Transfer Protocol (HTTP) header or a proxy protocol version two (PPV2) header. In turn, the service 642 receives the traffic with the updated header 634, determines network information that includes, among other things, the VCN identifier and the CID, and makes a call (that includes this network information) to the egress policy evaluator 650. The egress policy evaluator 650 then determines the egress policy 652 using at least the VCN identifier and determines that the egress policy 652 specifies that egress traffic from the VCN 620 via the gateway 624 to the service 642 is allowed and sends a response 626 to the service 642. Here, the response 626 indicates that the traffic received by the service 642 is authorized and, as such, the service 642 stores the traffic in data storage provided by the service tenancy 640. A similar outcome occurs if traffic egresses from the second network location to the second service because the egress policy 652 allows it, whereby the second service further processes this traffic.

Now consider the case where similar traffic egresses from the second network location to the service 642. Similar processing as above occurs, except that the response of the egress policy evaluator 652 indicates that such traffic is disallowed. Accordingly, the service 642 drops the traffic instead of storing it. A similar outcome occurs if traffic egresses from the gateway 624 to the second service because the egress policy 652 disallows it, whereby the second service drops this traffic.

Figure 7:
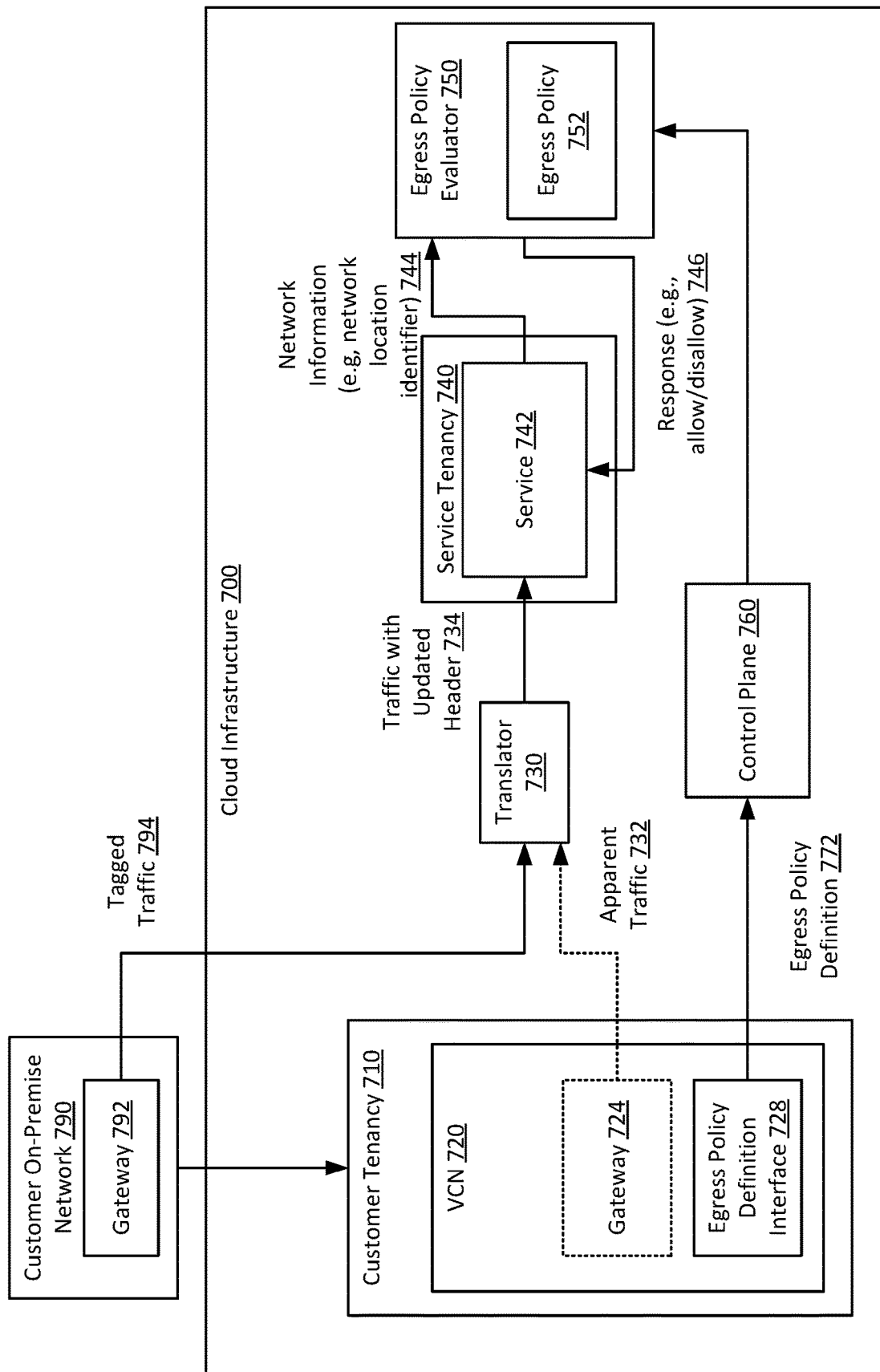
FIG. 7 illustrates another example of a cloud infrastructure that implements egress traffic policy enforcement at a target service to prevent or mitigate the risk of data exfiltration according to embodiments of the present disclosure.

FIG. 7 illustrates another example of a cloud infrastructure 700 that implements egress traffic policy enforcement at a target service (e.g., corresponding to a multi-tenant endpoint) to prevent or mitigate the risk of data exfiltration according to embodiments of the present disclosure. Similar to FIG. 6, the example of FIG. 7 corresponds to a direct data flow. Here, however, rather than traffic egressing from a customer tenancy 710 of a customer, the traffic egresses from a customer on-premise network 790 of the customer.

The cloud infrastructure 700 is an example of any of the CSPIs described in the present disclosure and includes similar components to the ones described in FIG. 6. Similarities are not repeated herein in the interest of brevity, but equivalently apply to FIG. 7. As illustrated, the cloud infrastructure 700 includes the customer tenancy 710 (similar to the customer tenancy 610 of FIG. 6), a service tenancy 740 (similar to the service tenancy 640 of FIG. 6), an egress policy evaluator 750 (similar to the egress policy evaluator 650 of FIG. 6), a control plane 760 (similar to the control plane 660 of FIG. 6), and a translator 730 (similar to the translator 630 of FIG. 6). The customer tenancy 710 includes a VCN 720 (similar to the VCN 620 of FIG. 6) that provides, among other things, an egress policy definition interface 728 (e.g., similar to the egress policy definition interface 620 of FIG. 6). The service tenancy 740 includes a service 742 (similar to the service 62 of FIG. 6). The egress policy evaluation 750 stores an egress policy 752 for the customer (similar to the egress policy 652 of FIG. 6) based on customer input via the egress policy definition 728, whereby this input provides an egress policy definition 722 (similar to the egress policy definition 622 of FIG. 6). The customer on-premise network 790 can be connected to the customer tenancy 710 (e.g., via Oracle's FastConnect technology).

In an example, traffic of the customer on-premise network 790 egresses from this network 790 via a network location (shown as a gateway 792, which may be an Internet gateway for example). This traffic can be destined to the service 742.

To prevent or mitigate the risk of data exfiltration, traffic tagging and egress policy enforcement are also used for such egress traffic from the customer on-premise network 790.

One challenge in this case is that the network location belongs to the customer on-premise network 790 rather than the customer tenancy 710 in the cloud infrastructure 700. As such, the tagging is performed by the network location from which the traffic egresses (e.g., the gateway 792).

In an example, the tagging is similar to the tagging described in FIG. 6, whereby network information is added to the traffic by the gateway 792 such that the traffic egresses as tagged traffic 794. The network information indicates among other things the customer on-premise network 790 and/or the customer tenancy 790 (e.g., by including an identifier of the customer on-premise network 790 and/or an identifier of the customer tenancy 710), a source IP address (e.g., of a computing resource of the customer on-premise network 790 sending or requesting the sending of the traffic), and an identifier of the network location (e.g., the gateway) where this identifier is unique to the cloud infrastructure 700 and/or the customer tenancy 710 and is different from a network address of the network location (e.g., different from an IP address of the gateway 792).

The identifier of the network location can include a DPID or a CID. For example, the identifier can be made available to the customer on-premise network 790 upon a registration (e.g., via the control plane 760) of the gateway 792 with the cloud infrastructure 700 (e.g., with the egress policy evaluator 750) as a network location from which traffic of the customer on-premise network 790 egresses and to which the egress policy 752 applies. The identifier can be provided by the control plane 760 to the gateway 792, and/or some other service of the customer on-premise network 790.

As such, an identifier associated with the customer tenancy 710 is assigned the gateway 792 that belongs to the customer on-premise network 729. By using such an identifier to tag the traffic egressing from the gateway 724, this tagged traffic 794 can be processed in a manner similar to that of FIG. 6, whereby the egress policy 752 associated with the customer tenancy 710 can be enforced on such traffic 794. In other words, the gateway 792, which is a network location belonging to the customer on-premise network 790, appears (as shown with a dotted rectangle) to be a gateway 724 belonging to the VCN 720 (or the customer tenancy 710). Similarly, the tagged traffic 794, which is egressing from the customer on-premise network 790, appears (as shown with a dotted arrow) as apparent traffic 732 that egresses from the VCN 720 (or the customer tenancy 710) via the gateway 724.

To illustrate, consider the following example. The service 742 is a data storage service. The customer defines the egress policy 752 to allow egress traffic to the service 742 such that the represented data can be stored conditioned on the egress traffic being sent via the gateway 792 but not via a second network location of the customer on-premise network 790. The egress policy 752 disallows egress traffic via the gateway 792 to a second service of the service tenancy 740 but allows such egress traffic via the second network location.

An authorized user operating a user device can access a compute resource of the customer on-premise network 790 and request data available from the customer on-premise network 790 to be stored by the service 742. Traffic representing this data egresses from the gateway 792. The gateway 792 tags the traffic with network information including a VCN identifier of the VC 720, an overlay source IP address (e.g., the overlay IP address of the compute instance 722), and DPID of the gateway 792, resulting in the tagged traffic 794. Such network information can be included in an IP options field in a header of a packet that represents a portion of the traffic. Next, the translator 730 receives the tagged traffic 794 and translates the DPID into a CID of the gateway 792. This translation can be possible based on a predefined mapping between the DPID and CID, where this predefined mapping is generated upon the registration of the gateway 792. The translator 730 updates the tagged traffic with an updated header 734 that includes the CID, where the updated header 734 can be an HTTP header or a PPV2 header. In turn, the service 742 receives the traffic with the updated header 734, determines network information that includes, among other things, the VCN identifier and the CID, and makes a call (that includes this network information) to the egress policy evaluator 750. The egress policy evaluator 750 then determines the egress policy 752 using at least the VCN identifier and determines that the egress policy 752 specifies that egress traffic from the customer on-premise network 790 via the gateway 792 to the service 742 is allowed and sends a response 726 to the service 742. Here, the response 726 indicates that the traffic received by the service 742 is authorized and, as such, the service 742 stores the traffic in data storage provided by the service tenancy 740. A similar outcome occurs if traffic egresses from the second network location to the second service because the egress policy 752 allows it, whereby the second service further processes this traffic.

Now consider the case where similar traffic egresses from the second network location to the service 742. Similar processing as above occurs, except that the response of the egress policy evaluator 752 indicates that such traffic is disallowed. Accordingly, the service 742 drops the traffic instead of storing it. A similar outcome occurs if traffic egresses from the gateway 792 to the second service because the egress policy 752 disallows it, whereby the second service drops this traffic.

Figure 8:
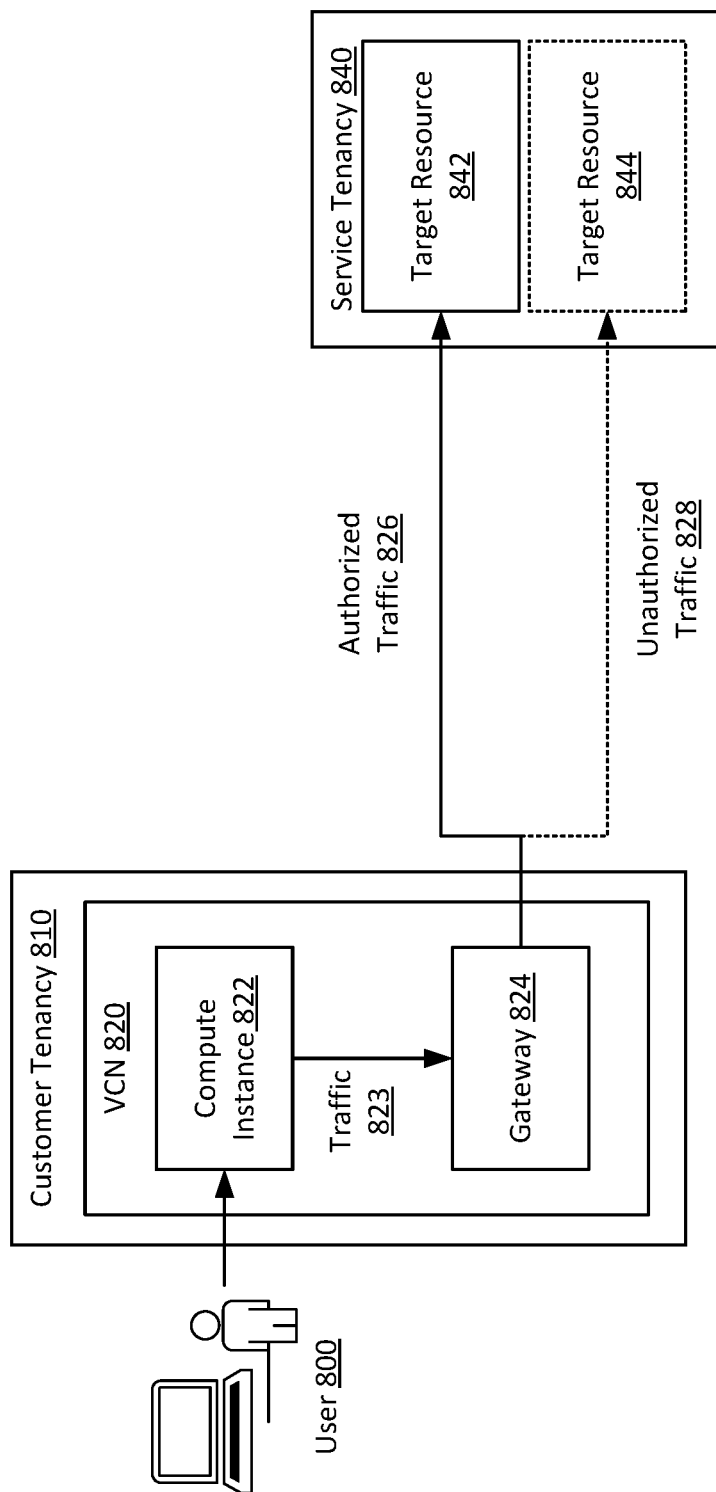
FIG. 8 illustrates an example of data exfiltration when no egress policy enforcement is performed at a target service according to embodiments of the present disclosure.

FIG. 8 illustrates an example of data exfiltration when no egress policy enforcement is performed at a target service. In the example of FIG. 8, an insider threat is described. More specifically, a customer is associated with a customer tenancy 810 (e.g., the customer tenancy 610 of FIG. 6) that is hosted by a cloud infrastructure (e.g., the cloud infrastructure 600 of FIG. 6). The cloud infrastructure can also host a service tenancy 840 that provides a multi-tenant service (e.g., the service 642 of FIG. 6). In the interest of clarity, this multi-tenant service is described in FIG. 8 as a data storage service, although other types of storages are likewise possible. In the interest of brevity, the data exfiltration is described in connection with the customer tenancy 810, although it can likewise exist in the use case of a customer on-premise network.

A user 800 can operate a user device to interface with a compute instance of a VCN 820 of the customer tenancy. The user 800 can have access to two sets of credentials: a first set is associated with the customer tenancy 810, and a second set is associated with a personal tenancy of the user 800. By using the first set of credentials, the user 800 can cause traffic 823 to egress from the VCN 820 via the gateway 824 and be stored, by the target service (e.g., the data storage service corresponding to a same multi-tenant endpoint), at a target resource 842 (e.g., a storage location) of the service tenancy 840. The target resource 842 corresponds to proper storage for the customer tenancy 810. Such a result corresponds to authorized traffic 826 being properly stored. The service tenancy 840 exposes multiple target resources under a same multi-tenant endpoint, such as the target resource 842 and a target resource 844.

In comparison, by using the second set of credentials, the user 800 can cause the traffic 823 to also egress from the VCN 820 via the gateway 824 and be stored, by the target service, at the other target resource 844 of the service tenancy 840. The target resource 844 corresponds to unauthorized storage associated with the personal tenancy of the user 800 instead of the customer tenancy 810. Such a result corresponds to unauthorized traffic 828 being properly stored (e.g., to data exfiltration given an insider threat of a malicious user with proper credentials associated with the customer tenancy 810). Applying ACLs to prevent such data exfiltration may not be possible or effective because the user 800 can properly login to the VCN 820 (e.g., via the compute instance 822) with the first set of credentials.

Figure 9:
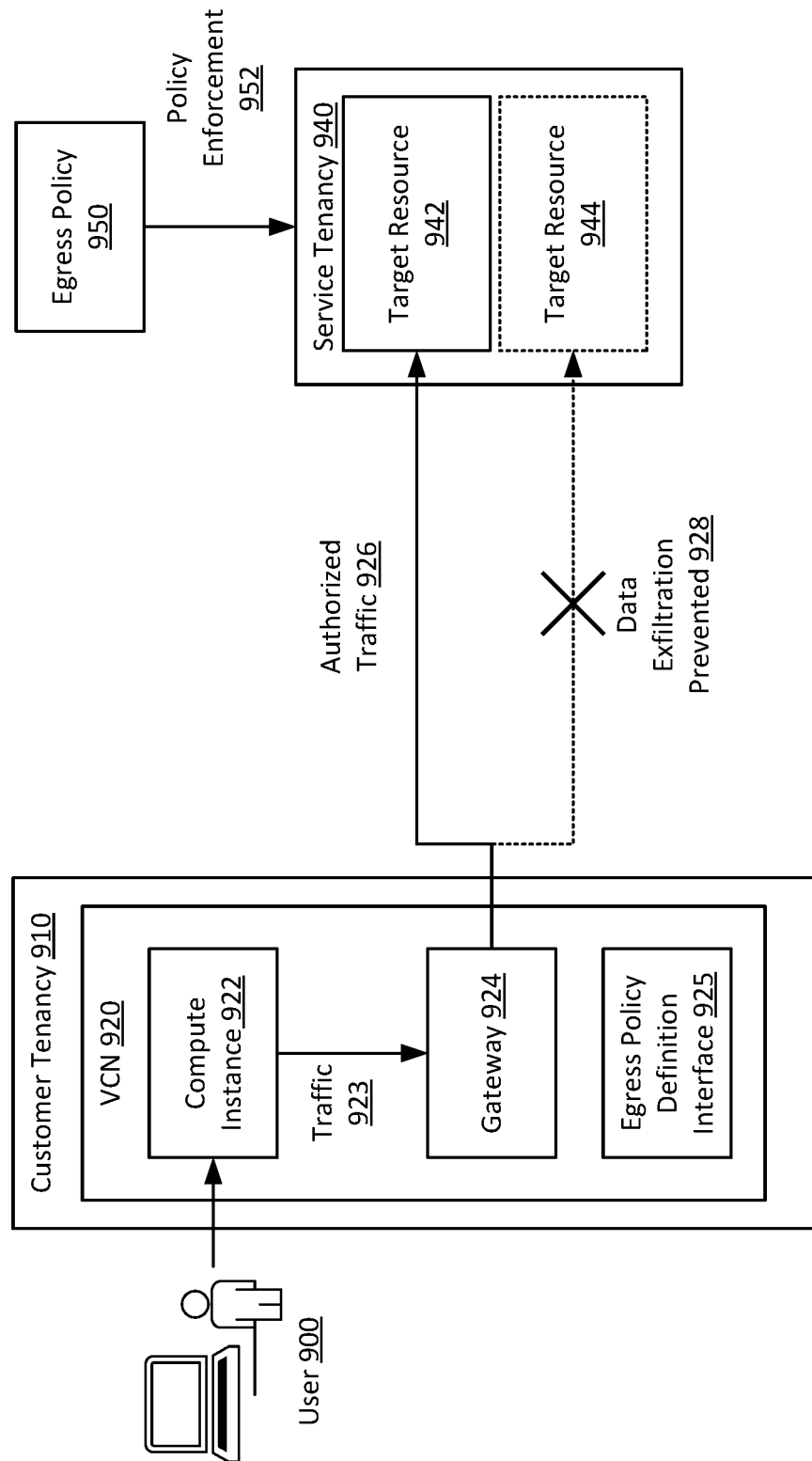
FIG. 9 illustrates an example of preventing data exfiltration by enforcing an egress policy at a target service.

FIG. 9 illustrates an example of preventing data exfiltration by enforcing an egress policy 950 at a target service according to embodiments of the present disclosure. In the example of FIG. 9, an insider threat is described. More specifically, a customer is associated with a customer tenancy 910 (e.g., the customer tenancy 610 of FIG. 6) that is hosted by a cloud infrastructure (e.g., the cloud infrastructure 600 of FIG. 6). The cloud infrastructure can also host a service tenancy 940 that provides a multi-tenant service (e.g., the service 642 of FIG. 6). In the interest of clarity, this multi-tenant service is described in FIG. 9 as a data storage service, although other types of storages are likewise possible. In the interest of brevity, the data exfiltration is described in connection with the customer tenancy 910, although it can likewise exist in the use case of a customer on-premise network.

A user 900 can operate a user device to interface with a compute instance of a VCN 920 of the customer tenancy. The user 900 can have access to two sets of credentials: a first set is associated with the customer tenancy 910, and a second set is associated with a personal tenancy of the user 900. By using the first set of credentials, the user 900 can cause traffic 923 to egress from the VCN 920 via the gateway 924 and be destined to a target resource 942 associated with the customer tenancy 810. Here, the target service enforces the egress policy 950 defined by the customer and determines that, given that the traffic is egressing from the VCN 920 via the gateway 924 to the target resource 942, the egress policy 950 allows this traffic. Accordingly, the traffic is stored at the target resource 942. Such a result corresponds to authorized traffic 926 being properly stored. The service tenancy 940 exposes multiple target resources under a same multi-tenant endpoint, such as the target resource 942 and a target resource 944.

In comparison, by using the second set of credentials, the user 900 can cause the traffic 923 to also egress from the VCN 920 via the gateway 924 and be destined to the other target resource 944 associated with the personal tenancy of the user 900. Here, the target service also enforces the egress policy 950 and determines that this egress traffic is disallowed. Accordingly, the target service does not store the traffic 923 in the target resource 944, thereby preventing 928 data exfiltration.

Figure 10:
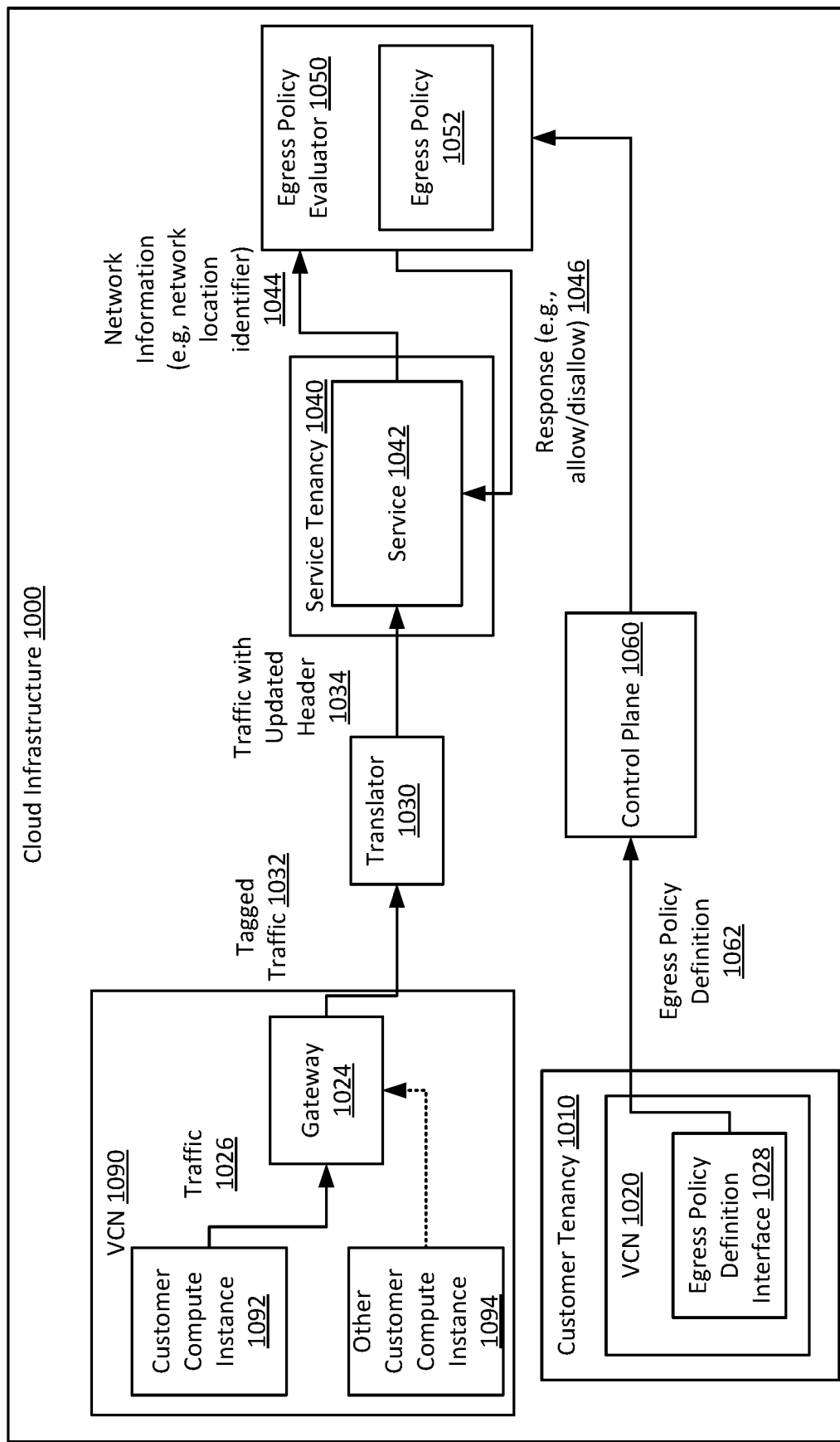
FIG. 10 illustrates another example of a cloud infrastructure that implements egress traffic policy enforcement at a target service to prevent or mitigate the risk of data exfiltration according to embodiments of the present disclosure.

FIG. 10 illustrates another example of a cloud infrastructure 1000 that implements egress traffic policy enforcement at a target service to prevent or mitigate the risk of data exfiltration according to embodiments of the present disclosure. Unlike FIG. 6, the example of FIG. 10 corresponds to an indirect data flow. In particular, rather than traffic egressing from a customer tenancy 1010 of a customer (or an on-premise network as in FIG. 7), the traffic egresses from a VCN 1090 that belong to a service tenancy. The VCN 1090 includes different compute resources configured for different customers, such as a customer compute instance 1092 spawned for the customer and another customer compute instance 1094 spawned for another customer associated with a different customer tenancy. Here, first traffic corresponding to the customer and second traffic corresponding to the other customer can egress from the VCN 1090 via the same network location, illustrated as gateway 1024 (e.g., a service gateway). Each of such traffic can be tagged (e.g., by the gateway 1024) to indicate the corresponding customer such that the applicable egress policy is enforced by a target service.

The cloud infrastructure 1000 is an example of any of the CSPIs described in the present disclosure and includes similar components to the ones described in FIG. 6. Similarities are not repeated herein in the interest of brevity, but equivalently apply to FIG. 10. As illustrated, the cloud infrastructure 1000 includes the customer tenancy 1010 (similar to the customer tenancy 610 of FIG. 6), a service tenancy 1040 (similar to the service tenancy 640 of FIG. 6), an egress policy evaluator 1050 (similar to the egress policy evaluator 650 of FIG. 6), a control plane 1060 (similar to the control plane 660 of FIG. 6), a translator 1030 (similar to the translator 630 of FIG. 6), and the VCN 1090. The customer tenancy 1010 includes a VCN 1020 (similar to the VCN 620 of FIG. 6) that provides, among other things, an egress policy definition interface 1028 (e.g., similar to the egress policy definition interface 620 of FIG. 6). The service tenancy 1040 includes a service 1042 (similar to the service 62 of FIG. 6). The egress policy evaluation 1050 stores an egress policy 1052 for the customer (similar to the egress policy 652 of FIG. 6) based on customer input via the egress policy definition 1028, whereby this input provides an egress policy definition 1022 (similar to the egress policy definition 622 of FIG. 6). The VCN 1090 can be belong to a multi-tenancy service tenancy that provides various services to different customers. For example, each customer needs to be present proper credentials to be able to request one of such services, resulting in, for instance, a compute instance being spawn (or some other computing resource being configured) in the VCN 1090 (or some other part of the multi-tenancy service tenancy).

In an example, a user of the customer associated with the customer tenancy traffic operates a user device and provides proper user credentials to spawn the customer compute instance 1092. This compute instance 1092 can generate data. The user can request the data to be sent to the service 1042. The data represents traffic 1026 that egress from the VCN 1090 via a network location (shown as the gateway 1024). As illustrated with a dotted arrow, an authorized user can do the same to spawn the other customer compute instance 1094 that in turns generates traffic that egresses from the VCN 1090 via the gateway towards the service 1042. As such, the traffic 1026 needs to be differentiated from the other traffic of the other customer such that the egress policy 1052 is enforced by the service 1042 on the traffic 1026 but not the other traffic.

Similar to the description herein above, to prevent or mitigate the risk of data exfiltration, traffic tagging and egress policy enforcement are also used for the traffic 1026 egressing from the VCN 1090. The tagging can be performed by the gateway 1024, whereas the enforcement can be performed by the service 1042. The tagging similar to the tagging described in FIGS. 6 and 7 except that, whereas the traffic 1026 originates from the VCN 1090 (providing services to multiple customer tenancies), the tagging needs to show the traffic 1026 as if it is originating from the customer tenancy 1010 such that the egress policy 1052 can be applied thereto. As such, in the indirect data flow use case, as in FIG. 10, the gateway 1024 needs to be configured to tag the traffic 1026 of the customer compute instance 1029 with an identifier of the customer tenancy 1010 or the customer's VCN 1020 instead of the VCN 1090 from which the traffic 1026 actually egresses. The enforcement is similar to the enforcement described in FIGS. 6 and 7 except that the customer has no visibility or knows about the gateway 1024 (or, more generally, the network location of the VCN 1090 from which the traffic 1026 egresses). As such, the egress policy 1052 needs to be defined without such knowledge. The tagging and egress policy features are further described herein below.

In support of the tagging, a registration procedure is completed in which the overlay IP address of the customer compute instance 1092 is associated with an identifier of the customer tenancy 1010 and/or the VCN 1020. In an example, the registration procedure can be completed by a service associated with the VCN 1020. For instance, the VCN 1020 can be part of a service tenancy that hosts such a service. Upon the registration, the IP address-identifier association can be provided (e.g., in a push) to the gateway 1024. When the gateway 1024 receives the traffic 1026, it determines its overlay source IP address (e.g., the IP address of the customer compute instance 1092) and, based on the IP address-identifier association, determines the identifier. The gateway 1024 can then tag the traffic 1026 with this identifier, among other network information (e.g., the overlay source IP address and an identifier of the gateway 1024, such as its DPID). For example, the identifier of the customer tenancy 1010, the overlay source IP address, an identifier of the customer compute instance 1092 other than its overly source IP address (e.g., a cloud identifier (CID) of this compute instance 1092), and the DPID can be added in one or more IP options fields of a header of a packet representing at least a portion of the traffic 1026.

In support of the egress policy enforcement, the egress policy definition 1062 can indicate that egress traffic associated with the customer need to be allowed or disallowed for particular types of network locations (e.g., particular types of gateways). In the direct data flow use cases of FIGS. 6 and 7, the customer has visibility of the gateways and, thus, can define an action to be performed per gateway. Here, in the indirect data flow use case, the customer has not visibility of the gateway 1024 and, thus, the action definition cannot be as granular. Instead, the action definition can be for a type of gateways (e.g., for any gateway that belongs to a service tenancy from which traffic of the customer can egress).

To illustrate, consider the following example. The service 1042 is a data storage service. The customer defines the egress policy 1052 to allow egress traffic to the service 1042 from any gateway of a first service tenancy. The egress policy 1052 disallows egress traffic via any gateway of a second service tenancy.

An authorized user operating a user device can request the customer compute instance 1092 to be spawned and request data originating from the customer compute instance 1092 to be stored by the service 1042. Traffic 1026 representing this data egresses from the gateway 1024.

The gateway 1024 tags the traffic with network information including a VCN identifier of the VC 1020, an overlay source IP address (e.g., the overlay IP address of the customer compute instance 1092), and a DPID of the gateway 1024, resulting in tagged traffic 1032. Such network information can be included in an IP options field in a header of a packet that represents a portion of the traffic 1032. Next, the translator 1030 receives the tagged traffic 1032 and translates the DPID into a CID of the gateway 1024. This translation can be possible based on a predefined mapping between the DPID and CID. The translator 1030 updates the tagged traffic 1032 with an updated header 1034 that includes the CID, where the updated header 1034 can be an HTTP header or a PPV2 header. In turn, the service 1042 receives the traffic with the updated header 1034, determines network information that includes, among other things, the VCN identifier and the CID, and makes a call (that includes this network information) to the egress policy evaluator 1050. The egress policy evaluator 1050 then determines the egress policy 1052 using at least the VCN identifier and determines that the egress policy 1052 specifies that egress traffic from first service tenancy that includes the VCN 1090, determines that the gateway 1024 belongs to the first service tenancy and sends a response 1026 to the service 1042. Here, the response 1026 indicates that the traffic received by the service 1042 is authorized and, as such, the service 1042 stores the traffic in data storage provided by the service tenancy 1040.

Now consider the case where similar traffic of the customer egresses from the second service tenancy to the service 1042. Similar processing as above occurs, except that the response of the egress policy evaluator 1052 indicates that such traffic is disallowed. Accordingly, the service 1042 drops the traffic instead of storing it.

Figure 11:
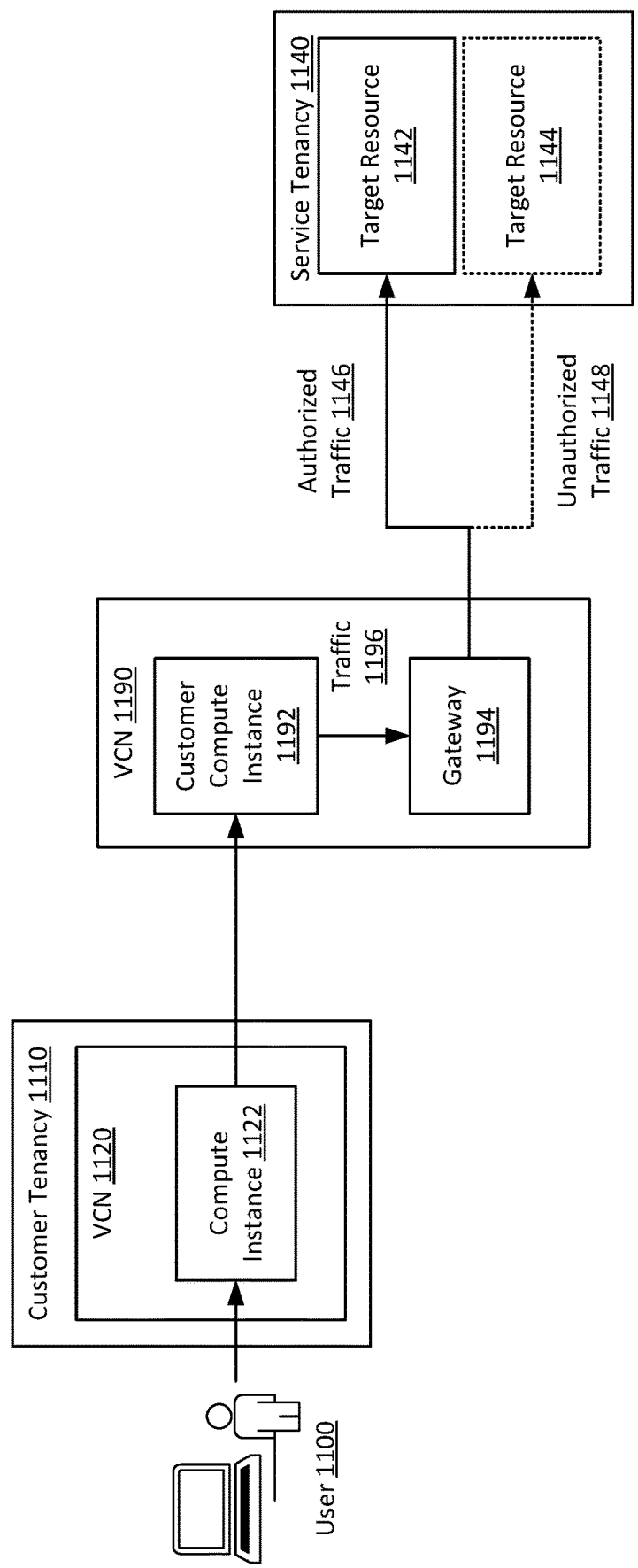
FIG. 11 illustrates an example of data exfiltration when no egress policy enforcement is performed at a target service.

FIG. 11 illustrates an example of data exfiltration when no egress policy enforcement is performed at a target service. In the example of FIG. 11, an insider threat is described in association with an indirect data flow. More specifically, a customer is associated with a customer tenancy 1110 (e.g., the customer tenancy 1010 of FIG. 10) that is hosted by a cloud infrastructure (e.g., the cloud infrastructure 1000 of FIG. 10). The cloud infrastructure can also host a VCN 1190 (e.g., the VCN 1090) that provides services for multiple customer tenancies. In addition, the cloud infrastructure can host a service tenancy 1140 (e.g., the service tenancy 1040) that provides endpoints for multiple customer tenancies and for the VCN 1190. In the interest of clarity, the service tenancy 1140 is described in FIG. 11 as providing a data storage service, although other types of storages are likewise possible. In the interest of brevity, the data exfiltration is described in connection with the customer tenancy 1110, although it can likewise exist in the use case of a customer on-premise network.

A user 1100 can operate a user device to interface with a compute instance of a VCN 1120 of the customer tenancy. The user 1100 can have access to two sets of credentials: a first set is associated with the customer tenancy 1110, and a second set is associated with a personal tenancy of the user 1100. By using the first set of credentials, the user 1100 can access a compute instance 1122 of the VCN 1120 and use this compute instance 1122 to spawn a customer compute instance 1192 in the VCN 1190. The traffic 1196 of the customer compute instance 1192 can egress from the VCN 1190 via a gateway 1194 of the VCN 1190 and be stored, by the target service (e.g., the data storage service), at a target resource 1142 (e.g., a storage location) of the service tenancy 1140. The target resource 1142 corresponds to proper storage for the customer tenancy 1110. Such a result corresponds to authorized traffic 1146 being properly stored. The service tenancy 1140 exposes multiple target resources under a same multi-tenant endpoint, such as the target resource 1142 and a target resource 1144.

In comparison, by using the second set of credentials, the user 1100 can cause the traffic 1196 to egress from the VCN 1190 via the gateway 1194 and be stored, by the target service, at the other target resource 1144 of the service tenancy 1140. The target resource 1144 corresponds to unauthorized storage associated with the personal tenancy of the user 1100 instead of the customer tenancy 1110. Such a result corresponds to unauthorized traffic 1148 being properly stored (e.g., to data exfiltration given an insider threat of a malicious user with proper credentials associated with the customer tenancy 1110). Applying ACLs to prevent such data exfiltration may not be possible or effective given the credentials of the user 1100.

Figure 12:
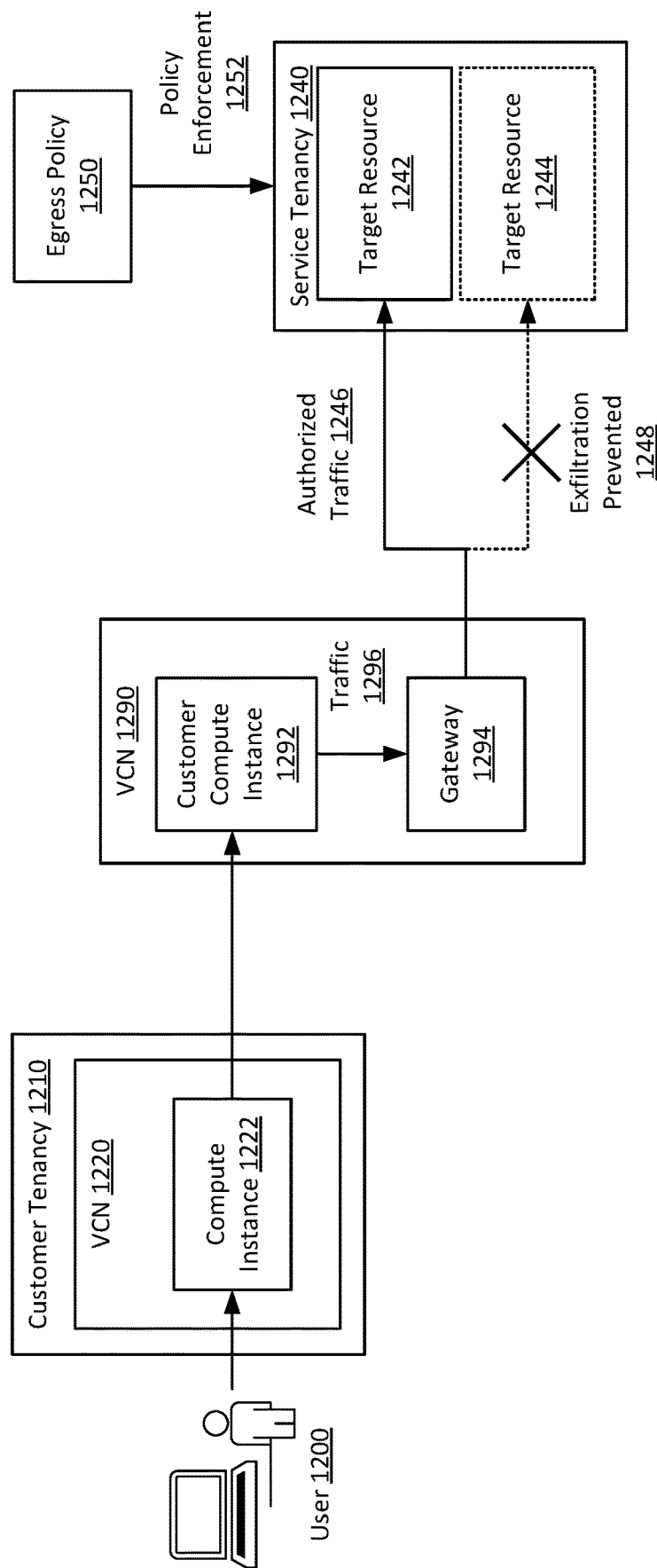
FIG. 12 illustrates an example of preventing data exfiltration by enforcing an egress policy at a target service according to embodiments of the present disclosure.

FIG. 12 illustrates an example of preventing data exfiltration by enforcing an egress policy 1250 at a target service according to embodiments of the present disclosure. In the example of FIG. 12, an insider threat is described in association with an indirect data flow. More specifically, a customer is associated with a customer tenancy 1210 (e.g., the customer tenancy 1010 of FIG. 10) that is hosted by a cloud infrastructure (e.g., the cloud infrastructure 1000 of FIG. 10). The cloud infrastructure can also host a VCN 1290 (e.g., the VCN 1090) that provides services for multiple customer tenancies. In addition, the cloud infrastructure can host a service tenancy 1240 (e.g., the service tenancy 1040) that provides endpoints for multiple customer tenancies and for the VCN 1290. In the interest of clarity, the service tenancy 1240 is described in FIG. 12 as providing a data storage service, although other types of storages are likewise possible. In the interest of brevity, the data exfiltration is described in connection with the customer tenancy 1210, although it can likewise exist in the use case of a customer on-premise network.

A user 1200 can have access to two sets of credentials: a first set is associated with the customer tenancy 1210, and a second set is associated with a personal tenancy of the user 1200. By using the first set of credentials, the user 1200 can access a compute instance 1222 of the VCN 1220 and use this compute instance 1222 to spawn a customer compute instance 1292 in the VCN 1290. The traffic 1296 of the customer compute instance 1292 can egress from the VCN 1290 via a gateway 1294 of the VCN 1290 and be destined to a target resource 1242 associated with the customer tenancy 1210. Here, the target service enforces the egress policy 1250 defined by the customer and determines that, given that the traffic 1296 is egressing from the VCN 1190 via the gateway 1294 and is associated with the customer tenancy 1210, the egress policy 1250 allows this traffic 1296. Accordingly, the traffic 1296 is stored at the target resource 1242. Such a result corresponds to authorized traffic 1246 being properly stored. The service tenancy 1240 exposes multiple target resources under a same multi-tenant endpoint, such as the target resource 1242 and a target resource 1244.

In comparison, by using the second set of credentials, the user 1200 can cause the traffic 1296 to also egress from the VCN 1290 via the gateway 1294 and be destined to the other target resource 1244 associated with the personal tenancy of the user 1200. Here, the target service also enforces the egress policy 1250 and determines that this egress traffic is disallowed. Accordingly, the target service does not store the traffic 1296 in the target resource 1244, thereby preventing 1228 data exfiltration.

Figure 13:
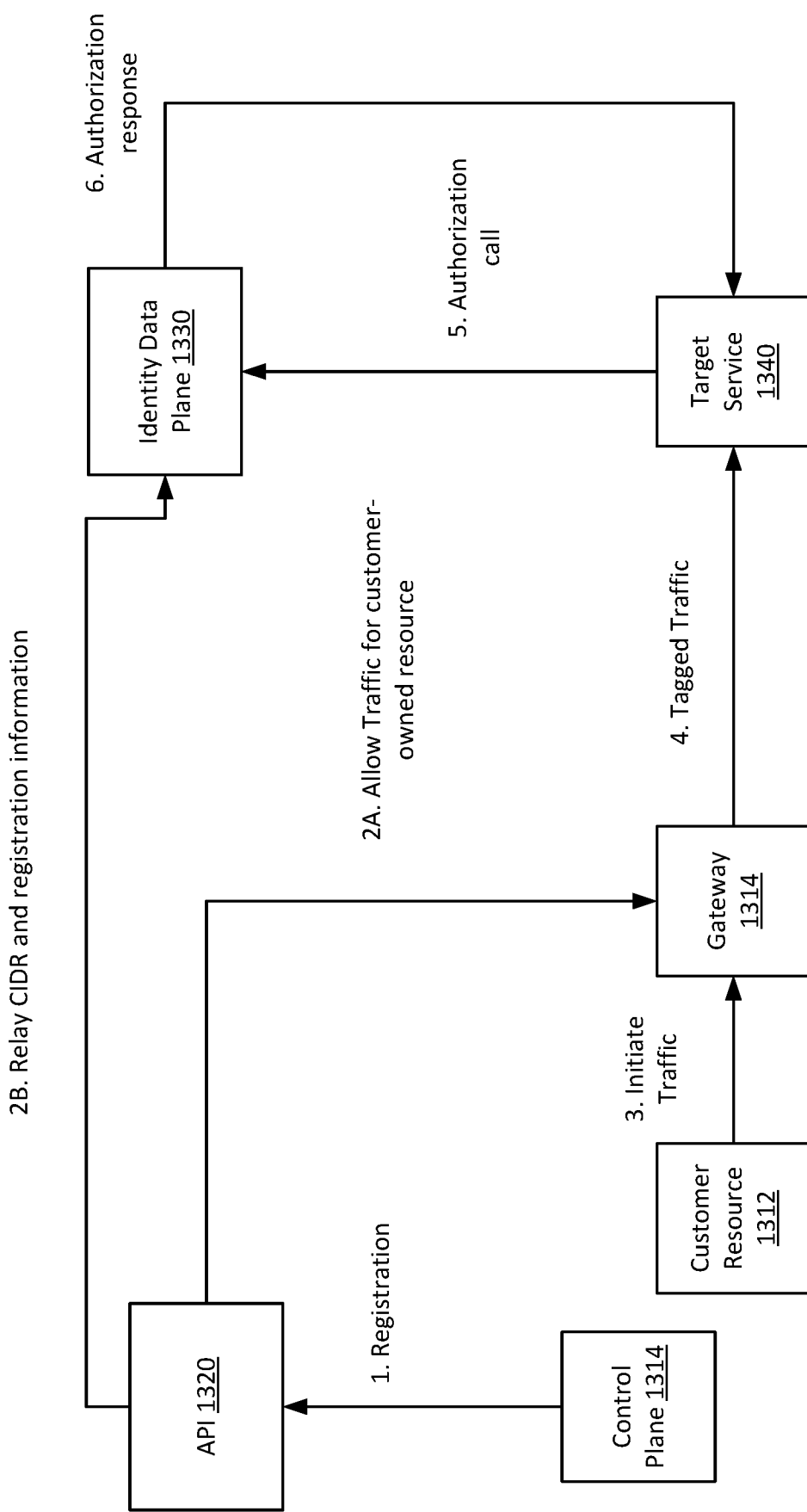
FIG. 13 illustrates an example of egress traffic enforcement according to embodiments of the present disclosure.

FIG. 13 illustrates an example of egress traffic enforcement according to embodiments of the present disclosure. A customer can be associated with a customer tenancy hosted in a cloud infrastructure, as described herein above. A customer resource 1312 of the customer can belong to a network and send traffic, from the network via a gateway 1314 of the network, destined to a target service 1340 of a service tenancy that can act as a traffic destination. The gateway 1314 tags the network traffic to indicate, among other things, the network and the gateway 1314. The target service 1340 (e.g., a multi-tenant endpoint) enforces an egress policy of the customer based on the tag.

In an example, the network includes a VCN that belongs to a customer tenancy of the customer. In another example, the network is an on-premise network of the customer. In yet another example, the network belongs to a service tenancy that provides services to multiple customers and that can act as a traffic source.

To enable the tagging, an authorized user of the customer can operate a user device and interface with a control plane 1314 to complete a registration. The specific steps and information involved in the registration can depend on the type of the network. In the example of the network including the customer's VCN, the registration can involve user input indicating, that egress traffic enforcement is to be used and the egress network locations of the VCN (e.g., the service gateways) to be associated with the egress traffic enforcement. In the example of the network including the customer's on-premise network, the registration can involve user input indicating that egress traffic enforcement is to be used and identifying the egress network locations of the on-premise network (e.g., the Internet gateways) to be associated with the egress traffic enforcement. The registration can further involve obtaining a DPID or a CID for each of such network locations. In the example of the network including the traffic source service tenancy, user input can be received indicating that egress traffic enforcement is to be used for the customer's traffic egressing from such a tenancy. Here, the registration can involve the traffic source service tenancy (e.g., a service thereof) associating an overlay IP address and/or a CID of the customer resource 1312 in the traffic source service tenancy with an identifier of the customer tenancy or the customer's VCN.

The control plane 1314 can perform the registration on behalf of the customer with an identity data plane 1330 via an API 1320. The identity data plane 1330 can be configured to maintain identity data for different customers and services and to provide an egress policy evaluator. The API 1320 relay registration information and a CIDR associated with the customer tenancy to the policy information. The registration information can include an identifier of the gateway 1314 (other than its IP address, such as a DPID and/or a CID), an overlay IP address of the customer resource 1312, an identifier of the customer resource 1312 (other than its IP address, such as a CID thereof), and an identifier of the customer tenancy (e.g., a CID thereof). Some or all of the registration information can also be pushed to the gateway 1314 (e.g., including the overlay IP address and identifier of the customer resource 1312, the identifier of the customer tenancy, the identifier of the gateway 1314 to use in the tagging).

Next, the customer resource 1312 initiate traffic to egress from the network via the gateway 1314. The gateway tags the traffic based on the received registration information, such as by adding the identifier of the customer tenancy, the overlay source IP address, and its own DPID in one or more IP options fields of a header included in the traffic. The tagged traffic is sent to the target service 1340. Although not illustrated in FIG. 13, a translator can be used to update the DPID of the gateway 1314 into the CID thereof and to send the updated tag in an HTTP header or a PPV2 header to the target service 1340. In turn, the target service makes an authorization call to the identity data plane 1330, where this call at least identifies the customer tenancy and the gateway 1314 and, possibly, the customer resource 1312. Based on the identifier of the customer tenancy, the identity data plane 1330 can determine the egress policy to apply. Based on the CID of the gateway 1314 and other information (e.g., the overlay source IP address, the overlay destination IP address, and the like), the identity data plane 1330 can determine an action to be performed on the traffic (e.g., to allow or disallow it) and can send an authorization response to the target service 1340 indicating the action. The target service 1340 can then perform the action.

The specific action can be defined in the egress policy and its application can depend on a number of conditions that the egress policy indicates. Example attributes to include in the egress policy are listed in the left column of Table 1 below.

FIGS. 6-13 (e.g., any service to which traffic egressing from a network is destined, where the service is outside the network).

The process 1400 includes, at block 1402, where the service receives traffic of a customer that is associated with a customer tenancy hosted by the cloud infrastructure, wherein the traffic is received from a network location and is destined to the service of the service tenancy, wherein the network location includes either a first network location of a network associated with the customer or a second network location of a multi-service tenancy hosting services for multiple customer tenancies. The first network location can

TABLE 1

| Attribute | Notes |
| --- | --- |
| ALLOW-EGRESS | [ ] indicates an optional clause. |
| BY group <g> | dynamic-group <dg> | any-authorized user [OF tenancy <tenancy name> | any-tenancy] | This specifies which authorized users are allowed to request traffic to egress.<br>Both BY or FROM NETWORK-ACTOR are allowed, at least one or the other is needed.<br>Omission of the BY clause (using only FROM NETWORK-ACTOR) is equivalent to "BY any-authorized user OF any-tenancy". This includes anonymous access.<br>any-authorized user is equivalent to any-user with proper credentials. |
| FROM NETWORK-ACTOR <network-actor-CID> | any-network-actor | Both BY or FROM NETWORK-ACTOR are allowed, at least one or the other is needed.<br>FROM NETWORK-ACTOR, in the case of ALLOW-EGRESS, refers to only to network actors (e.g., compute resources) in the customer's tenancy.<br>Omission of the FROM NETWORK-ACTOR clause (using only BY) is equivalent to "FROM NETWORK-ACTOR any-network-actor" |
| THROUGH NETWORK-LOCATION <named-network-location> | any-location | any-customer-location | any-network-location | any-SG | any-PE | Needed attribute.<br><named-network-location> is a collection of one or more customer network locations defined by the customer<br>any-customer-location refers to all networks gateways attached to customer VCNs. It does not need a user to create a network location.<br>any-network-location refers to all network locations used by customer instances of services running in a cloud infrastructure.<br>any-customer-location and any-network-location are mutually exclusive and together add up to any-location:<br>any-location == any-customer-location + any-OSN-location |
| [TO <meta-verb> <resource-kind>] | Omitting this statement is equivalent "TO manage all-resources"<br>Meta-verb refers to a particular action, indicated by the verb (e.g., writing).<br>Resource kind refers a type of resource to which the action applies (a storage bucked to which a write operation applies). |
| IN tenancy | tenancy <tenancy name> | any-tenancy | compartment <compartment> | compartment <compartment> OF tenancy <tenancy name> | any-cloud infrastructure-tenancy | Needed attribute.<br>Target of the network traffic (e.g., which tenancy/compartment the bucket resides in. 'IN tenancy' provides the most commonly requested level of exfiltration protection as it ensures that the target of request resides in the customer's tenancy).<br>any-cloud infrastructure-tenancy expands (on the service side) to a list of "tenancy <tenancy-name>" statements. |
| [WHERE any | all <condition>] | Request context for egress policy evaluations include request.network-location.* variables; maps to a network location defined on the control plane with specific VCN ID, gateway ID, etc. |

Figure 14:
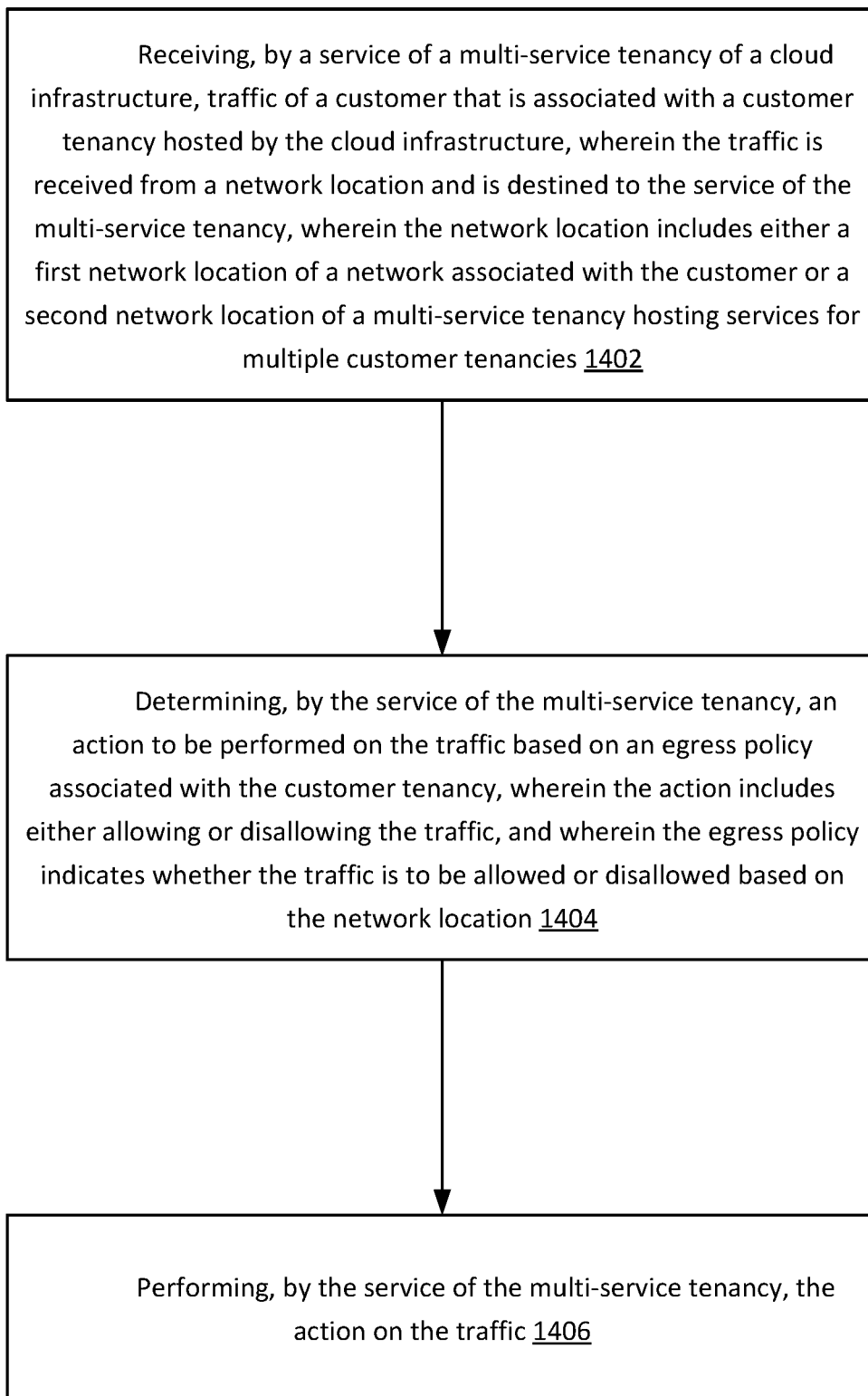
FIG. 14 is a flowchart illustrating a process for egress policy enforcement according to embodiments of the present disclosure.

FIG. 14 is a flowchart illustrating a process 1400 for egress policy enforcement according to embodiments of the present disclosure. In some embodiments, the process 1400 can be performed by a service of a service tenancy of a cloud infrastructure, such as any of the target services described in correspond to a gateway of a VCN or an on-premise network of the customer. The second network location can correspond to a gateway of a traffic source service tenancy that hosts a compute resource for the customer, among other compute resources for other clients.

The process 1400 includes, at block 1404, where the service determines an action to be performed on the traffic based on an egress policy associated with the customer tenancy, wherein the action includes either allowing or disallowing the traffic, and wherein the egress policy indicates whether the traffic is to be allowed or disallowed based on the network location. For example, the traffic is tagged by the network location. The service uses at least a portion of the tagged information to lookup the egress policy. The lookup can include, at least, an identifier of the network (e.g., a VCN ID of the customer) and an identifier of the network location (e.g., a CID of the gateway). The service can receive a response to the lookup. The egress policy can be determined based on the identifier of the network. The action can be determined from the egress policy based on the identifier of the network location (along with other attributes specified in the egress policy).

The process 1400 includes, at block 1406, where the service performs the action on the traffic. For example, if the traffic is to be allowed, the service can further process the traffic. Otherwise, the service can drop the traffic.

Figure 15:
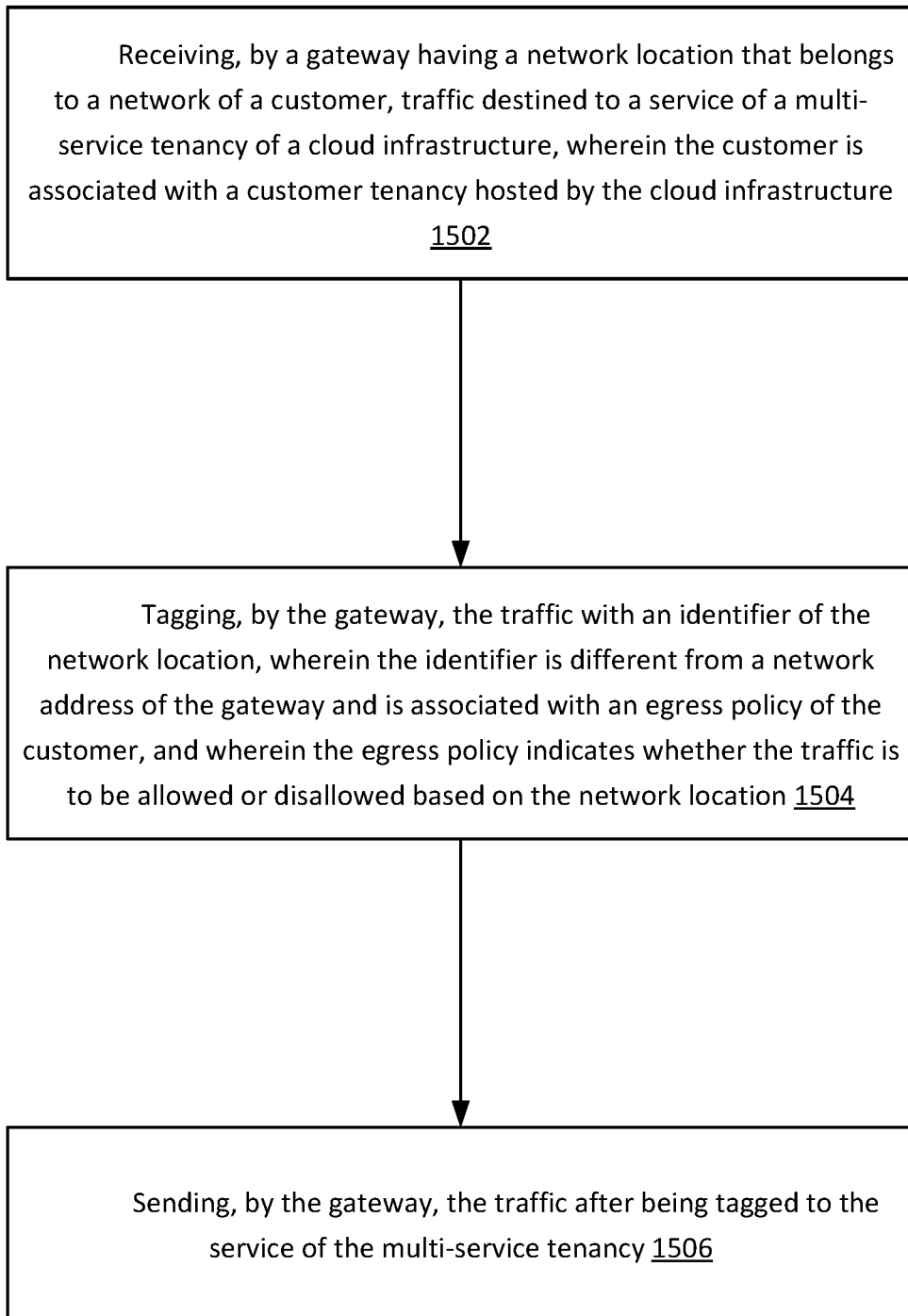
FIG. 15 is a flowchart illustrating a process for tagging traffic according to embodiments of the present disclosure.

FIG. 15 is a flowchart illustrating a process 1500 for tagging traffic according to embodiments of the present disclosure. In some embodiments, the process 1500 can be performed by a network location of a network of a customer (such as a gateway as further described in the blocks of the process 1500), where traffic leaves the network from the network location, such as any of the network locations described in FIGS. 6-7. Here, the network can be a VCN that belongs to a customer tenancy hosted by a cloud infrastructure or an on-premise network (in which case, the gateway of the on-premise network is associated with the customer tenancy).

The process 1500 includes, at block 1502, where the gateway receives traffic destined to a service of a service tenancy of the cloud infrastructure, wherein the customer is associated with the customer tenancy hosted by the cloud infrastructure. The service can be any of the target services described in FIGS. 6-13 (e.g., any service to which traffic egressing from a network is destined, where the service is outside the network).

The process 1500 includes, at block 1504, where the gateway tags the traffic with an identifier of the network location, wherein the identifier is different from a network address of the gateway and is associated with an egress policy of the customer, and wherein the egress policy indicates whether the traffic is to be allowed or disallowed based on the network location. For example, the traffic includes a packet. The gateway adds in one or more IP options of the packet's header, a DPID of the gateway in addition to other information, such as an identifier of the customer tenancy or VCN, and an overlay source IP address.

The process 1500 includes, at block 1506, where the gateway sends the traffic after being tagged to the service of the service tenancy.

Figure 16:
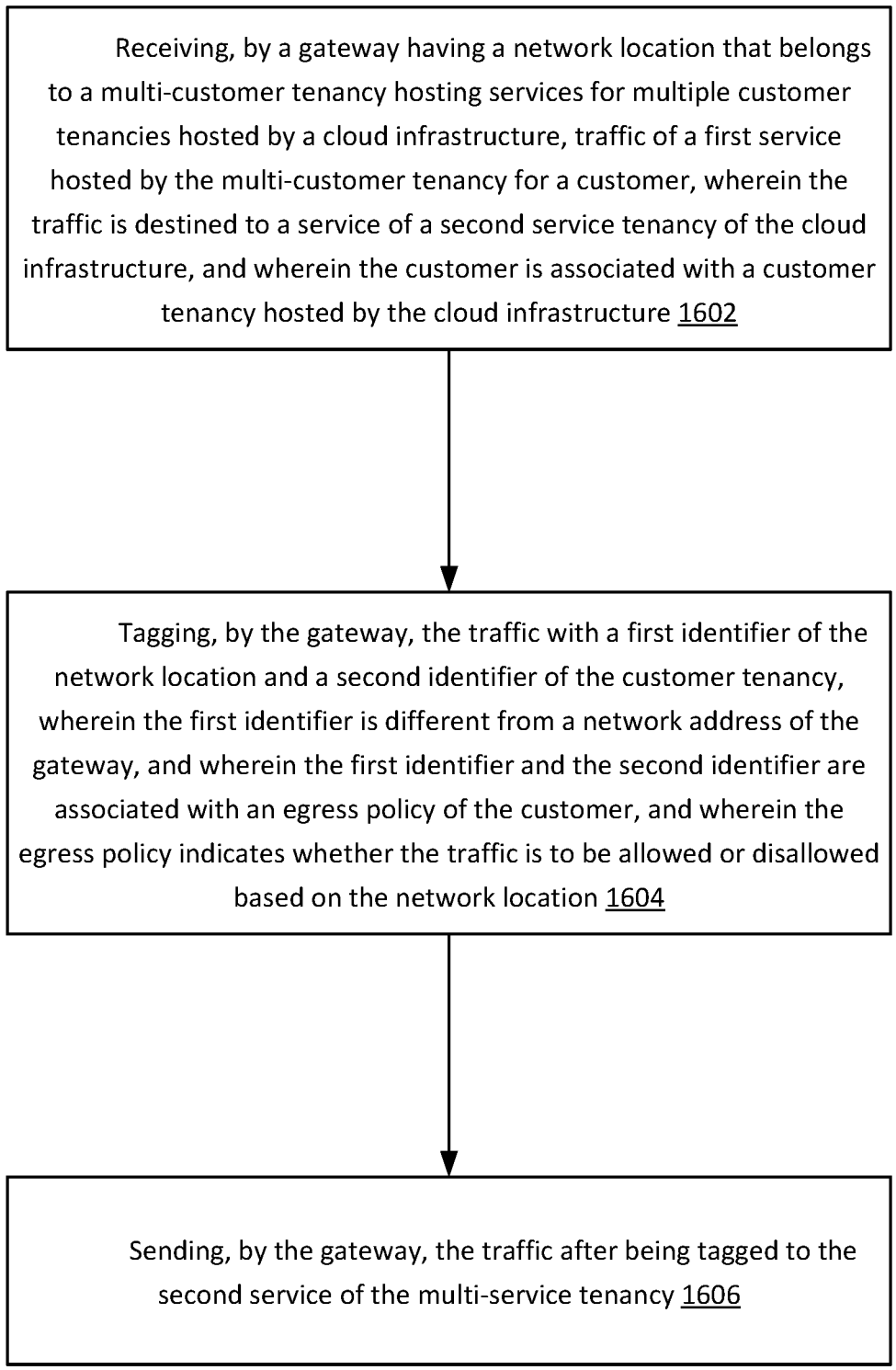
FIG. 16 is a flowchart illustrating a process for tagging traffic according to embodiments of the present disclosure.

FIG. 16 is a flowchart illustrating a process 1600 for tagging traffic according to embodiments of the present disclosure. In some embodiments, the process 1600 can be performed by a network location of multi-customer tenancy (such as a gateway as further described in the blocks of the process 1600), where traffic leaves this tenancy from the network location, such as any of the network locations described in FIG. 10. Here, the multi-customer tenancy can be a traffic source service tenancy that provides services to different clients, where each service can cause traffic to egress out of the tenancy via the network location.

The process 1600 includes, at block 1602, where the gateway receives traffic of a first service hosted by the multi-customer tenancy for a customer, wherein the traffic is destined to a second service of a service tenancy of the cloud infrastructure, and wherein the customer is associated with a customer tenancy hosted by the cloud infrastructure. The second service can be any of the target services described in FIGS. 6-13 (e.g., any multi-tenant endpoint to which traffic egressing from a network is destined, where the service is outside the network).

The process 1600 includes, at block 1604, where the gateway tags the traffic with a first identifier of the network location and a second identifier of the customer tenancy, wherein the first identifier is different from a network address of the gateway, wherein the first identifier and the second identifier are associated with an egress policy of the customer, and wherein the egress policy indicates whether the traffic is to be allowed or disallowed based on the network location.

The first identifier can be a DPID of the gateway. The second identifier can be a tenancy ID or a VCN ID. In an example, the traffic includes a packet. The gateway adds in one or more IP options of the packet's header, the DPID, the tenancy ID or VCN ID, and an overlay source IP address.

The process 1600 includes, at block 1606, where the gateway sends the traffic after being tagged to the second service of the service tenancy.

Figure 17:
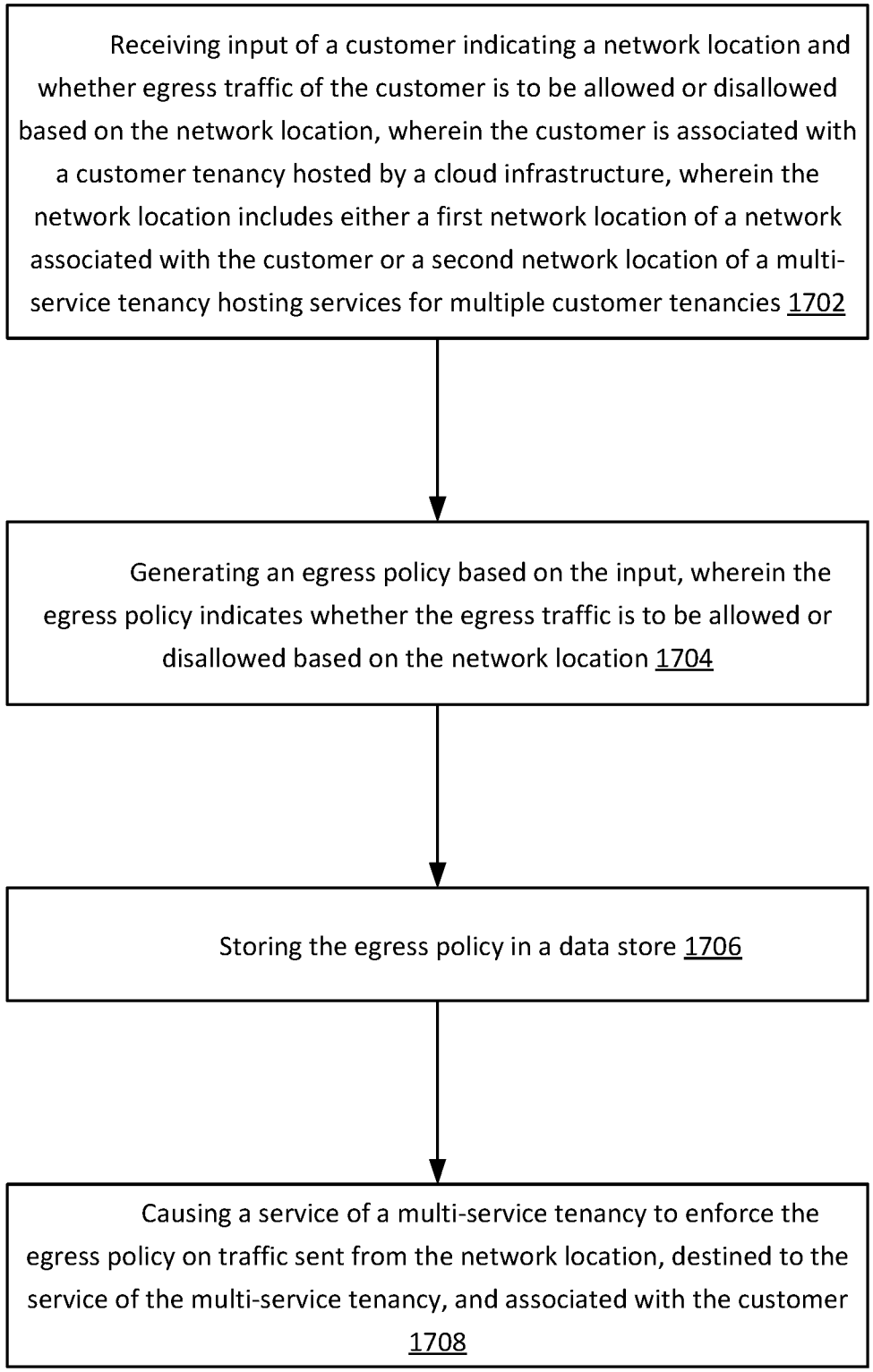
FIG. 17 is a flowchart illustrating a process for defining an egress policy according to embodiments of the present disclosure.

FIG. 17 is a flowchart illustrating a process 1700 for defining an egress policy according to embodiments of the present disclosure. In some embodiments, the process 1700 can be performed by a control plane of a cloud infrastructure.

The process 1700 includes, at block 1702, where the control plane receives input of a customer indicating a network location and whether egress traffic of the customer is to be allowed or disallowed based on the network location, wherein the customer is associated with a customer tenancy hosted by a cloud infrastructure, wherein the network location includes either a first network location of a network associated with the customer or a second network location of a multi-service tenancy hosting services for multiple customer tenancies. The first network location can correspond to a gateway of a VCN or an on-premise network of the customer. The second network location can correspond to a gateway of a traffic source service tenancy that hosts a compute resource for the customer, among other compute resources for other clients.

The process 1700 includes, at block 1704, where the control plane generates an egress policy based on the input, wherein the egress policy indicates whether the egress traffic is to be allowed or disallowed based on the network location. The egress policy can include multiple attributes such as some or all of the attributes shown in Table 1.

The process 1700 includes, at block 1706, where the control plane stores the egress policy in a data store. The data store can be accessible to an egress policy evaluator (or, more broadly, and identity data plane).

The process 1700 includes, at block 1708, where the control plane causes a service of a service tenancy to enforce the egress policy on traffic sent from the network location, destined to the service of the service tenancy, and associated with the customer. For example, by storing the egress policy, the service can look it up to enforce it upon receiving the traffic. The service can be any of the target services described in FIGS. 6-13 (e.g., any service to which traffic egressing from a network is destined, where the service is outside the network).

C—Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 18:
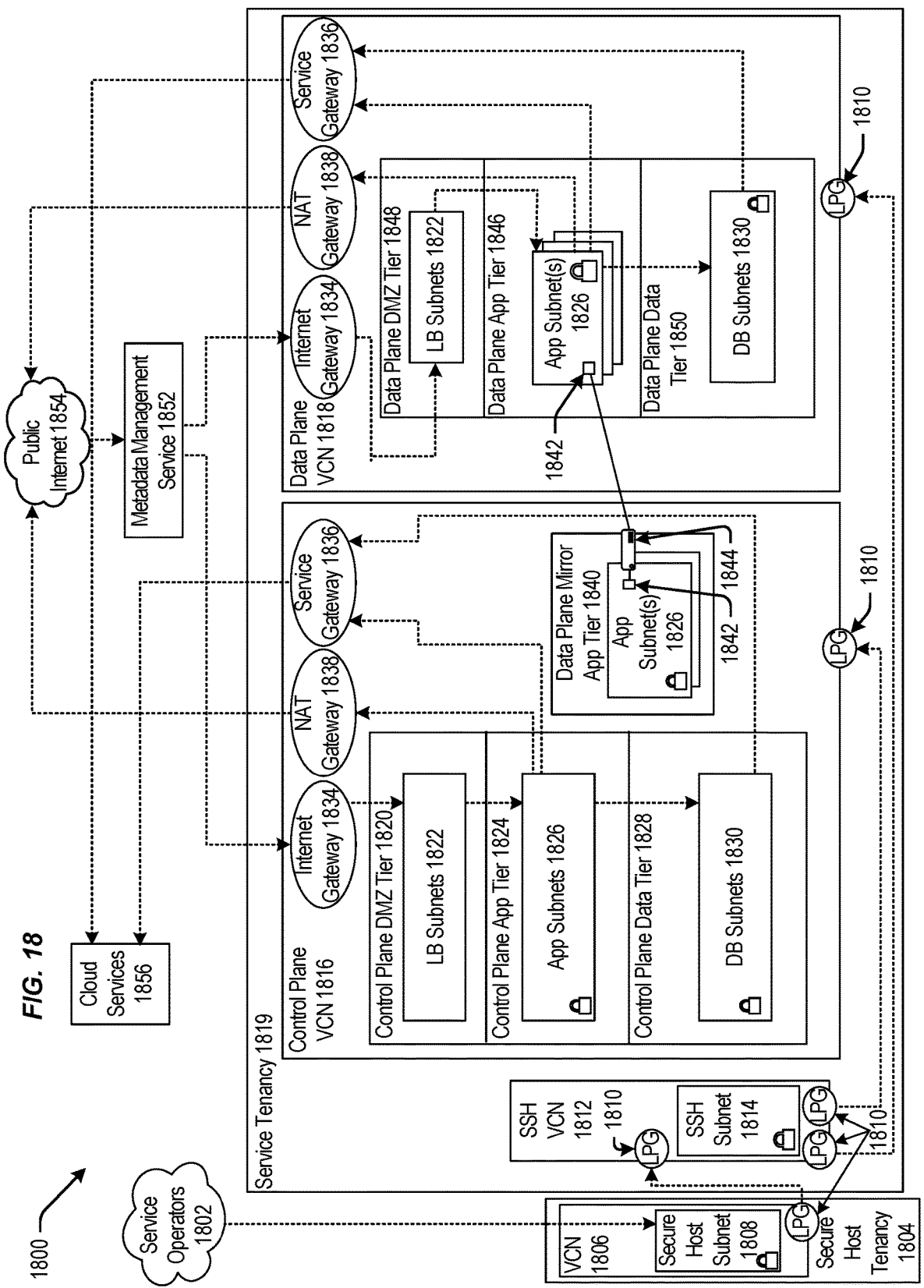
FIG. 18 is a block diagram illustrating an example pattern of an IaaS architecture, according to at least one embodiment.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry 8, Palm OS, and the like, and be Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as, for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep security breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and the NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively coupled to cloud services 1856.

In some examples, the service gateway 1836 of the control plane VCN 1816 or of the data plane VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. However, cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Memory that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users', or other customers', resources. Also, this embodiment may allow users or customers of the system to store databases privately without needing to rely on public Internet 1854, which may not have a desired level of security, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
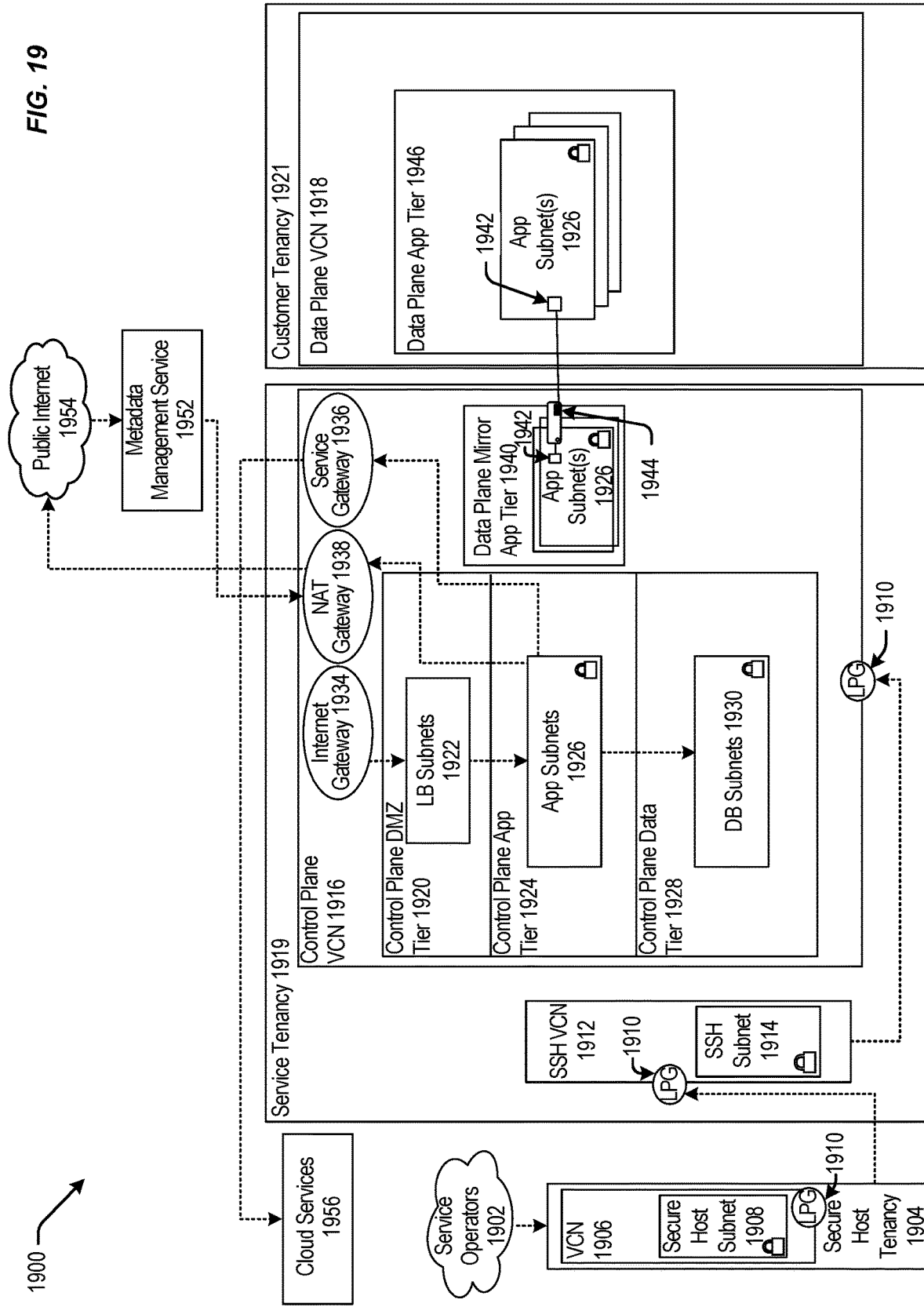
FIG. 19 is a block diagram illustrating another example pattern of an IaaS architecture, according to at least one embodiment.

FIG. 19 is a block diagram 1900 illustrating another example pattern of an IaaS architecture, according to at least one embodiment. Service operators 1902 (e.g., service operators 1802 of FIG. 18) can be communicatively coupled to a secure host tenancy 1904 (e.g., the secure host tenancy 1804 of FIG. 18) that can include a virtual cloud network (VCN) 1906 (e.g., the VCN 1806 of FIG. 18) and a secure host subnet 1908 (e.g., the secure host subnet 1808 of FIG. 18). The VCN 1906 can include a local peering gateway (LPG) 1910 (e.g., the LPG 1810 of FIG. 18) that can be communicatively coupled to a secure shell (SSH) VCN 1912 (e.g., the SSH VCN 1812 of FIG. 18) via an LPG 1810 contained in the SSH VCN 1912. The SSH VCN 1912 can include an SSH subnet 1914 (e.g., the SSH subnet 1814 of FIG. 18), and the SSH VCN 1912 can be communicatively coupled to a control plane VCN 1916 (e.g., the control plane VCN 1816 of FIG. 18) via an LPG 1910 contained in the control plane VCN 1916. The control plane VCN 1916 can be contained in a service tenancy 1919 (e.g., the service tenancy 1819 of FIG. 18), and the data plane VCN 1918 (e.g., the data plane VCN 1818 of FIG. 18) can be contained in a customer tenancy 1921 that may be owned or operated by users, or customers, of the system.

The control plane VCN 1916 can include a control plane DMZ tier 1920 (e.g., the control plane DMZ tier 1820 of FIG. 18) that can include LB subnet(s) 1922 (e.g., LB subnet(s) 1822 of FIG. 18), a control plane app tier 1924 (e.g., the control plane app tier 1824 of FIG. 18) that can include app subnet(s) 1926 (e.g., app subnet(s) 1826 of FIG. 18), a control plane data tier 1928 (e.g., the control plane data tier 1828 of FIG. 18) that can include database (DB) subnet(s) 1930 (e.g., similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g., the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g., the service gateway of FIG. 18) and a network address translation (NAT) gateway 1938 (e.g., the NAT gateway 1838 of FIG. 18). The control plane VCN 1916 can include the service gateway 1936 and the NAT gateway 1938.

The control plane VCN 1916 can include a data plane mirror app tier 1940 (e.g., the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g., the VNIC of 1842) that can execute a compute instance 1944 (e.g., similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g., the data plane app tier 1846 of FIG. 18) via the VNIC 1942 contained in the data plane mirror app tier 1940 and the VNIC 1942 contained in the data plane app tier 1946.

The Internet gateway 1934 contained in the control plane VCN 1916 can be communicatively coupled to a metadata management service 1952 (e.g., the metadata management service 1852 of FIG. 18) that can be communicatively coupled to public Internet 1954 (e.g., public Internet 1854 of FIG. 18). Public Internet 1954 can be communicatively coupled to the NAT gateway 1938 contained in the control plane VCN 1916. The service gateway 1936 contained in the control plane VCN 1916 can be communicatively coupled to cloud services 1956 (e.g., cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources that are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN 1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 18" may be located in Region 1 and in Region 2. If a call to Deployment 18 is made by the service gateway 1936 contained in the control plane VCN 1916 located in Region 1, the call may be transmitted to Deployment 18 in Region 1. In this example, the control plane VCN 1916, or Deployment 18 in Region 1, may not be communicatively coupled to, or otherwise in communication with, Deployment 18 in Region 2.

Figure 20:
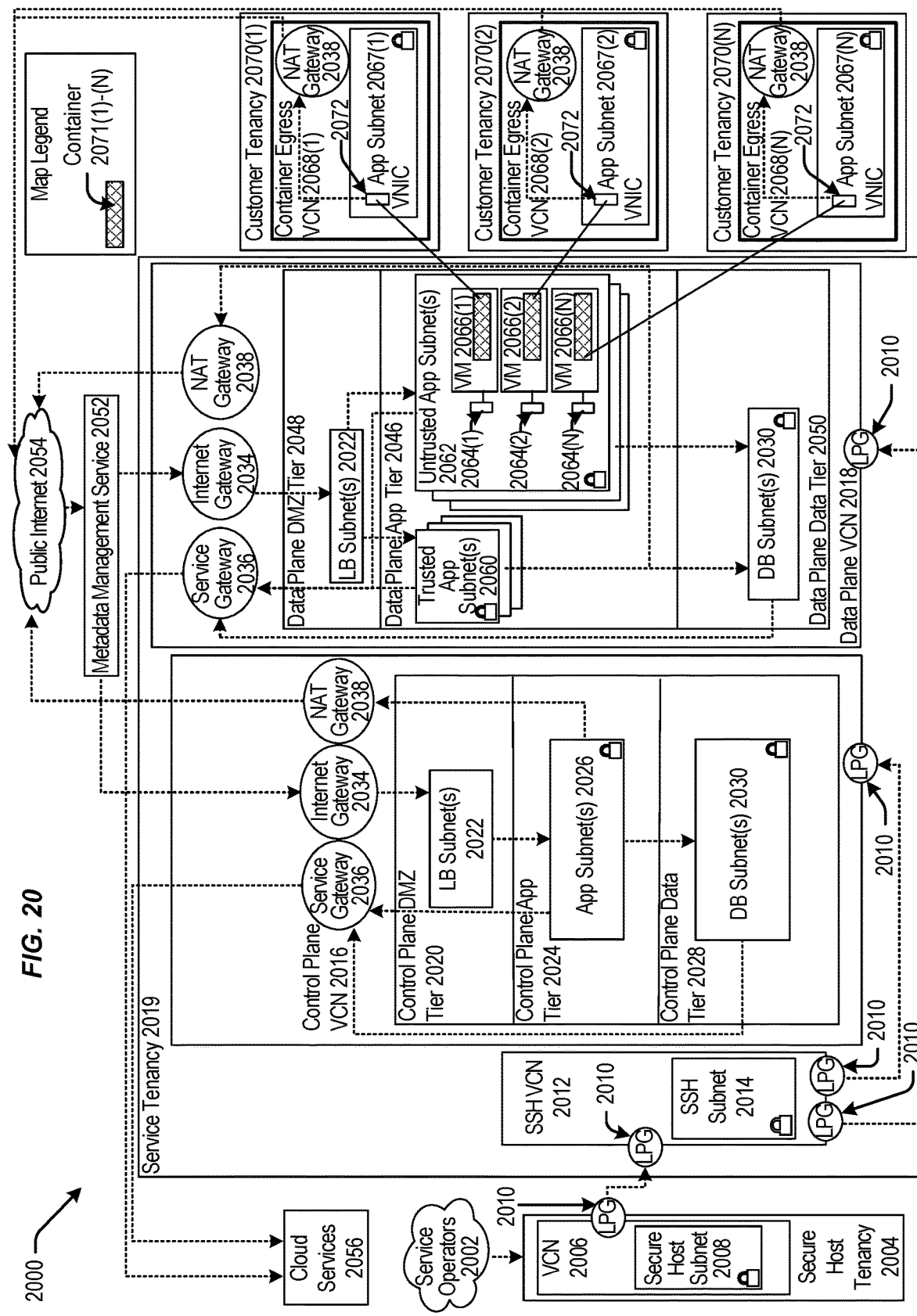
FIG. 20 is a block diagram illustrating another example pattern of an IaaS architecture, according to at least one embodiment.

FIG. 20 is a block diagram 2000 illustrating another example pattern of an IaaS architecture, according to at least one embodiment. Service operators 2002 (e.g., service operators 1802 of FIG. 18) can be communicatively coupled to a secure host tenancy 2004 (e.g., the secure host tenancy 1804 of FIG. 18) that can include a virtual cloud network (VCN) 2006 (e.g., the VCN 1806 of FIG. 18) and a secure host subnet 2008 (e.g., the secure host subnet 1808 of FIG. 18). The VCN 2006 can include an LPG 2010 (e.g., the LPG 1810 of FIG. 18) that can be communicatively coupled to an SSH VCN 2012 (e.g., the SSH VCN 1812 of FIG. 18) via an LPG 2010 contained in the SSH VCN 2012. The SSH VCN 2012 can include an SSH subnet 2014 (e.g., the SSH subnet 1814 of FIG. 18), and the SSH VCN 2012 can be communicatively coupled to a control plane VCN 2016 (e.g., the control plane VCN 1816 of FIG. 18) via an LPG 2010 contained in the control plane VCN 2016 and to a data plane VCN 2018 (e.g., the data plane 1818 of FIG. 18) via an LPG 2010 contained in the data plane VCN 2018. The control plane VCN 2016 and the data plane VCN 2018 can be contained in a service tenancy 2019 (e.g., the service tenancy 1819 of FIG. 18).

The control plane VCN 2016 can include a control plane DMZ tier 2020 (e.g., the control plane DMZ tier 1820 of FIG. 18) that can include load balancer (LB) subnet(s) 2022 (e.g., LB subnet(s) 1822 of FIG. 18), a control plane app tier 2024 (e.g., the control plane app tier 1824 of FIG. 18) that can include app subnet(s) 2026 (e.g., similar to app subnet(s) 1826 of FIG. 18), and a control plane data tier 2028 (e.g., the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1834 of FIG. 18) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 18) and a network address translation (NAT) gateway 2038 (e.g., the NAT gateway 1838 of FIG. 18). The control plane VCN 2016 can include the service gateway 2036 and the NAT gateway 2038.

The data plane VCN 2018 can include a data plane app tier 2046 (e.g., the data plane app tier 1846 of FIG. 18), a data plane DMZ tier 2048 (e.g., the data plane DMZ tier 1848 of FIG. 18), and a data plane data tier 2050 (e.g., the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g., public Internet 1854 of FIG. 18).

The Internet gateway 2034 contained in the control plane VCN 2016 and contained in the data plane VCN 2018 can be communicatively coupled to a metadata management service 2052 (e.g., the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively coupled to cloud services 2056.

In some embodiments, the data plane VCN 2018 can be integrated with customer tenancies 2070. This integration can be useful or desirable for customers of the IaaS provider in some cases such as a case in which support may be desired when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VMs 2066(1)-(N) that are contained in the untrusted app subnet(s) 2062), which may help prevent incorrect or otherwise undesirable code from damaging the network of the IaaS provider or from damaging a network of a different customer. The containers 2071(1)-(N) may be communicatively coupled to the customer tenancy 2070 and may be configured to transmit or receive data from the customer tenancy 2070. The containers 2071(1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
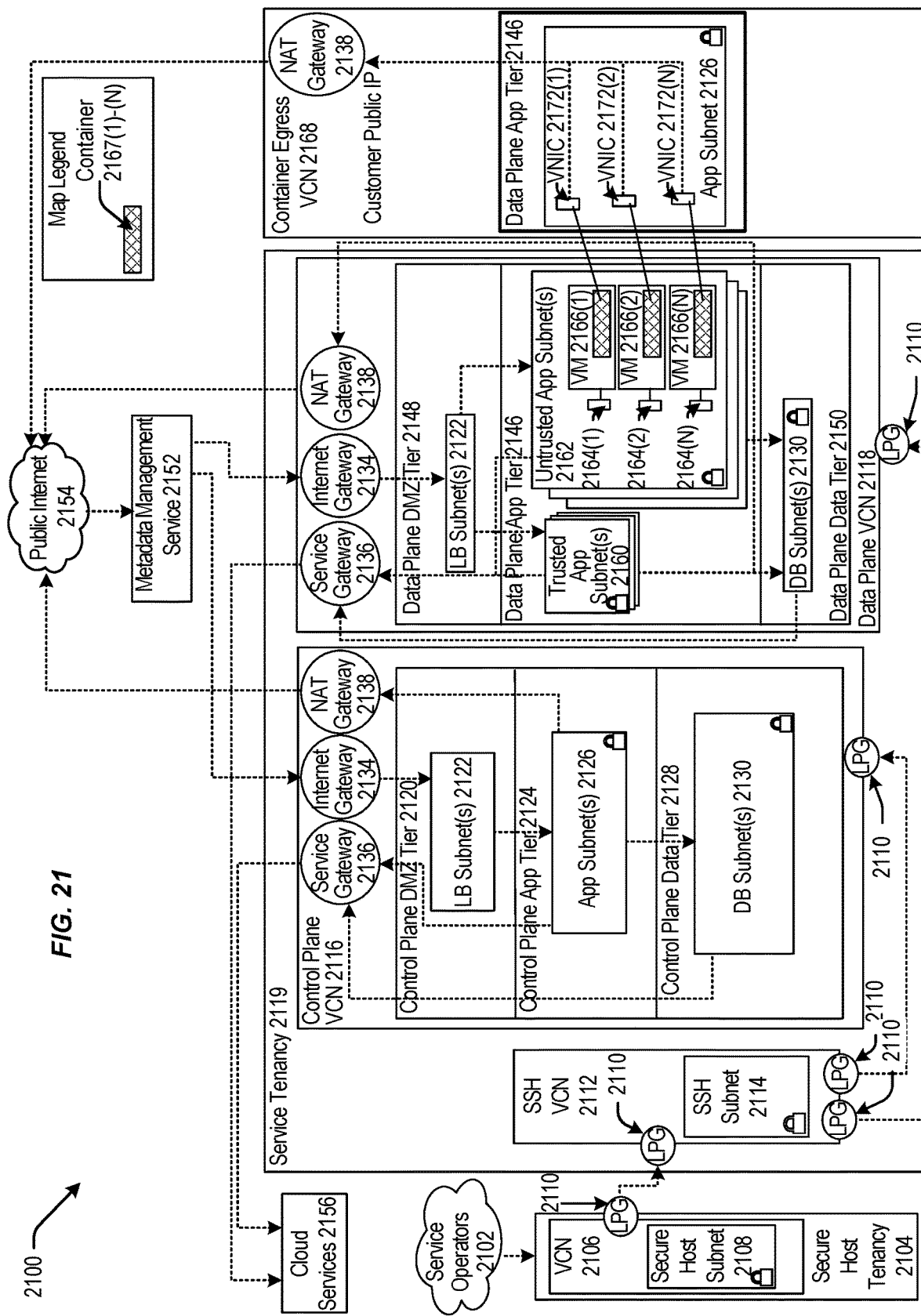
FIG. 21 is a block diagram illustrating another example pattern of an IaaS architecture, according to at least one embodiment.

FIG. 21 is a block diagram 2100 illustrating another example pattern of an IaaS architecture, according to at least one embodiment. Service operators 2102 (e.g., service operators 1802 of FIG. 18) can be communicatively coupled to a secure host tenancy 2104 (e.g., the secure host tenancy 1804 of FIG. 18) that can include a virtual cloud network (VCN) 2106 (e.g., the VCN 1806 of FIG. 18) and a secure host subnet 2108 (e.g., the secure host subnet 1808 of FIG. 18). The VCN 2106 can include an LPG 2110 (e.g., the LPG 1810 of FIG. 18) that can be communicatively coupled to an SSH VCN 2112 (e.g., the SSH VCN 1812 of FIG. 18) via an LPG 2110 contained in the SSH VCN 2112. The SSH VCN 2112 can include an SSH subnet 2114 (e.g., the SSH subnet 1814 of FIG. 18), and the SSH VCN 2112 can be communicatively coupled to a control plane VCN 2116 (e.g., the control plane VCN 1816 of FIG. 18) via an LPG 2110 contained in the control plane VCN 2116 and to a data plane VCN 2118 (e.g., the data plane 1818 of FIG. 18) via an LPG 2110 contained in the data plane VCN 2118. The control plane VCN 2116 and the data plane VCN 2118 can be contained in a service tenancy 2119 (e.g., the service tenancy 1819 of FIG. 18).

The control plane VCN 2116 can include a control plane DMZ tier 2120 (e.g., the control plane DMZ tier 1820 of FIG. 18) that can include LB subnet(s) 2122 (e.g., LB subnet(s) 1822 of FIG. 18), a control plane app tier 2124 (e.g., the control plane app tier 1824 of FIG. 18) that can include app subnet(s) 2126 (e.g., app subnet(s) 1826 of FIG. 18), a control plane data tier 2128 (e.g., the control plane data tier 1828 of FIG. 18) that can include DB subnet(s) 2130 (e.g., DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g., the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g., the service gateway of FIG. 18) and a network address translation (NAT) gateway 2138 (e.g., the NAT gateway 1838 of FIG. 18). The control plane VCN 2116 can include the service gateway 2136 and the NAT gateway 2138.

The data plane VCN 2118 can include a data plane app tier 2146 (e.g., the data plane app tier 1846 of FIG. 18), a data plane DMZ tier 2148 (e.g., the data plane DMZ tier 1848 of FIG. 18), and a data plane data tier 2150 (e.g., the data plane data tier 1850 of FIG. 18). The data plane DMZ tier 2148 can include LB subnet(s) 2122 that can be communicatively coupled to trusted app subnet(s) 2160 (e.g., trusted app subnet(s) 2060 of FIG. 20) and untrusted app subnet(s) 2162 (e.g., untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N), and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g., public Internet 1854 of FIG. 18).

The Internet gateway 2134 contained in the control plane VCN 2116 and contained in the data plane VCN 2118 can be communicatively coupled to a metadata management service 2152 (e.g., the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively coupled to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers 2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 22:
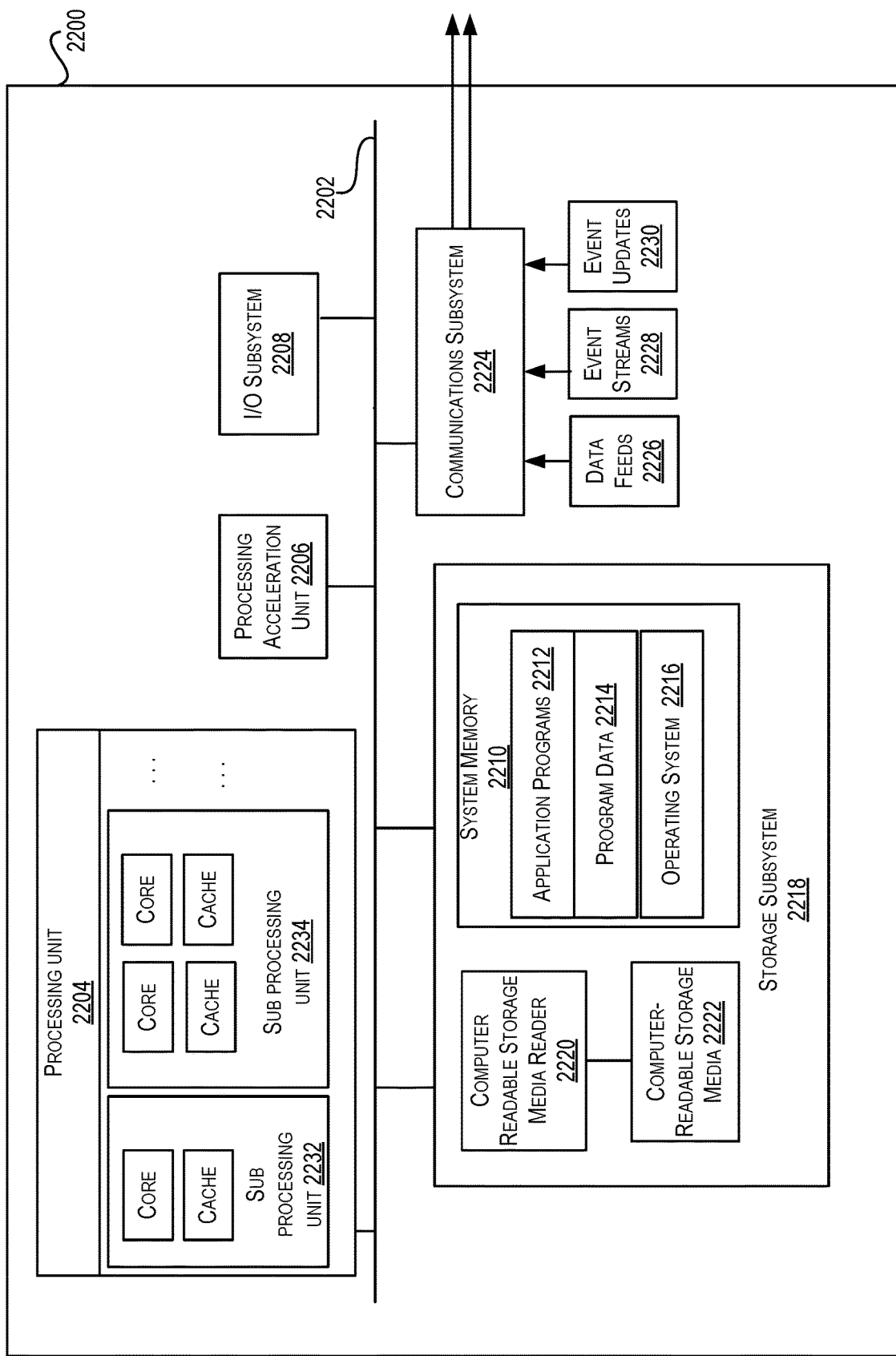
FIG. 22 illustrates an example computer system, in which various embodiments may be implemented.

FIG. 22 illustrates an example computer system 2200, in which various embodiments may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, or medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 22 OS, and Palm® OS operating systems.

Storage subsystem 2218 may also provide a tangible computer-readable storage medium for storing the basic programming and data constructs that provide the functionality of some embodiments. Software (programs, code modules, instructions) that, when executed by a processor, provides the functionality described above may be stored in storage subsystem 2218. These software modules or instructions may be executed by processing unit 2204. Storage subsystem 2218 may also provide a repository for storing data used in accordance with the present disclosure.

Storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head-mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The words "example" and "exemplary" are used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   receiving, by a gateway having a network location that belongs to a network of a customer, traffic destined to a service of a service tenancy of a cloud infrastructure, wherein the customer is associated with a customer tenancy hosted by the cloud infrastructure;
   tagging, by the gateway, the traffic with an identifier of the network location, wherein the identifier is different from a network address of the gateway and is associated with an egress policy of the customer, wherein the identifier includes a data plane identifier (DPID) of the gateway, and wherein the egress policy indicates whether the traffic is to be allowed or disallowed based on the network location; and
   sending, by the gateway, the traffic after being tagged to the service of the service tenancy.

2. The computer-implemented method of claim 1, wherein the network location belongs to an on-premise network of the customer and is associated with a cloud identifier such that the network location is represented as belonging to a virtual cloud network of the customer tenancy.

3. The computer-implemented method of claim 1, wherein the customer tenancy includes a virtual cloud network, and wherein the network location belongs to the virtual cloud network.

4. The computer-implemented method of claim 1, wherein tagging the traffic comprises including, in the traffic, the DPID, an identifier of the network, and a source internet protocol (IP) address.

5. The computer-implemented method of claim 4, wherein the DPID, the identifier of the network, and the source IP address are included in one or more IP options fields of a packet that corresponds to the traffic.

6. The computer-implemented method of claim 4, wherein the DPID is translated into a cloud identifier (CID), and wherein the CID is used to determine the egress policy.

7. The computer-implemented method of claim 6, wherein the CID is generated based on a registration of the network location by the customer in association with defining the egress policy.

8. A system having a network location that belongs to a network of a customer, the system comprising:
   one or more processors; and
   one or more memory storing instructions that, upon execution by the one or more processors, configure the system to:
   receive traffic destined to a service of a service tenancy of a cloud infrastructure, wherein the customer is associated with a customer tenancy hosted by the cloud infrastructure;
   tag the traffic with an identifier of the network location, wherein the identifier is different from a network address of a gateway and is associated with an egress policy of the customer, wherein the identifier includes a data plane identifier (DPID) of the gateway, and wherein the egress policy indicates whether the traffic is to be allowed or disallowed based on the network location; and
   send the traffic after being tagged to the service of the service tenancy.

9. The system of claim 8, wherein the network location belongs to an on-premise network of the customer and is associated with a cloud identifier such that the network location is represented as belonging to a virtual cloud network of the customer tenancy.

10. The system of claim 8, wherein the customer tenancy includes a virtual cloud network, and wherein the network location belongs to the virtual cloud network.

11. The system of claim 8, wherein tagging the traffic comprises including, in the traffic, the DPID, an identifier of the network, and a source internet protocol (IP) address.

12. The system of claim 11, wherein the DPID, the identifier of the network, and the source IP address are included in one or more IP options fields of a packet that corresponds to the traffic.

13. The system of claim 11, wherein the DPID is translated into a cloud identifier (CID), and wherein the CID is used to determine the egress policy.

14. The system of claim 13, wherein the CID is generated based on a registration of the network location by the customer in association with defining the egress policy.

15. One or more computer-readable storage media storing instructions that, upon execution on a system, cause the system to perform operations comprising:
receiving traffic destined to a service of a service tenancy of a cloud infrastructure, wherein a customer is associated with a customer tenancy hosted by the cloud infrastructure, the system having a network location that belongs to a network of the customer;
tagging traffic with an identifier of the network location, wherein the identifier is different from a network address of a gateway and is associated with an egress policy of the customer, wherein the identifier includes a data plane identifier (DPID) of the gateway, and wherein the egress policy indicates whether the traffic is to be allowed or disallowed based on the network location; and
sending the traffic after being tagged to the service of the service tenancy.

16. The one or more computer-readable storage media of claim 15, wherein the network location belongs to an on-premise network of the customer and is associated with a cloud identifier such that the network location is represented as belonging to a virtual cloud network of the customer tenancy.

17. The one or more computer-readable storage media of claim 15, wherein the customer tenancy includes a virtual cloud network, and wherein the network location belongs to the virtual cloud network.

18. The one or more computer-readable storage media of claim 15, wherein tagging the traffic comprises including, in the traffic, the DPID, an identifier of the network, and a source internet protocol (IP) address.

19. The one or more computer-readable storage media of claim 18, wherein the DPID, the identifier of the network, and the source IP address are included in one or more IP options fields of a packet that corresponds to the traffic.

20. The one or more computer-readable storage media of claim 18, wherein the DPID is translated into a cloud identifier (CID), and wherein the CID is used to determine the egress policy.

* * * * *